I

(12) United States Patent
Roach

(10) Patent No.: US 10,402,912 B2
(45) Date of Patent: Sep. 3, 2019

(54) INTERMEDIATION SERVER FOR CROSS-JURISDICTIONAL INTERNET ENFORCEMENT

(75) Inventor: Perry J. Roach, Guelph (CA)

(73) Assignee: NETSWEEPER (BARBADOS) INC., St. Michael (BB)

(*) Notice: Subject to any disclaimer, the term of this patent is extended or adjusted under 35 U.S.C. 154(b) by 0 days.

(21) Appl. No.: 14/342,229

(22) PCT Filed: Sep. 12, 2011

(86) PCT No.: PCT/CA2011/001012
§ 371 (c)(1),
(2), (4) Date: Feb. 28, 2014

(87) PCT Pub. No.: WO2013/037028
PCT Pub. Date: Mar. 21, 2013

(65) Prior Publication Data
US 2014/0214639 A1  Jul. 31, 2014

(51) Int. Cl.
G06Q 40/00 (2012.01)
G06Q 30/04 (2012.01)
G06Q 50/26 (2012.01)

(52) U.S. Cl.
CPC ......... *G06Q 40/123* (2013.12); *G06Q 30/04* (2013.01); *G06Q 50/26* (2013.01)

(58) Field of Classification Search
CPC .................................................. G06Q 40/00
USPC ............................................... 705/31, 36 T
See application file for complete search history.

(56) References Cited

U.S. PATENT DOCUMENTS

| | | |
|---|---|---|
| 6,963,739 B2 | 11/2005 | Dorenbosch et al. |
| 6,980,549 B1 | 12/2005 | Shabtay et al. |
| 6,993,502 B1 | 1/2006 | Gryglewicz et al. |
| 7,152,103 B1 | 12/2006 | Ryan et al. |
| 7,489,701 B2 | 2/2009 | Lodha |
| 7,681,032 B2 | 3/2010 | Peled et al. |
| 7,808,918 B2 | 10/2010 | Bugenhagen |
| 7,809,827 B1 | 10/2010 | Apte et al. |
| 7,954,144 B1 | 5/2011 | Ebrahimi et al. |
| 7,958,258 B2 | 6/2011 | Yeung et al. |
| 2002/0198814 A1 | 12/2002 | Bansal et al. |
| 2003/0216981 A1 | 11/2003 | Tillman |

(Continued)

FOREIGN PATENT DOCUMENTS

| | | |
|---|---|---|
| WO | WO-2003001324 A2 | 1/2003 |
| WO | WO-20090117733 A2 | 9/2009 |
| WO | WO-2011004258 A2 | 1/2011 |

OTHER PUBLICATIONS

Extended European Search Report dated Mar. 17, 2015 for corresponding European Application No. EP11872173.7.

(Continued)

*Primary Examiner* — Ojo O Oyebisi
(74) *Attorney, Agent, or Firm* — Perry + Currier Inc.

(57) ABSTRACT

A system, method and apparatus for cross-jurisdictional internet enforcement are provided. An intermediation server receives data indicative of on-line communications between at least one communication device and at least one on-line sales presence, determines that the data indicative of the on-line communications is associated with legal data associated with the on-line sales presence and when the legal data meets a given criteria, triggers remedial legal action.

25 Claims, 19 Drawing Sheets

(56) References Cited

U.S. PATENT DOCUMENTS

| | | |
|---|---|---|
| 2004/0181599 A1 | 9/2004 | Kreusch et al. |
| 2005/0144297 A1 | 6/2005 | Dahlstrom et al. |
| 2005/0188081 A1 | 8/2005 | Gibson et al. |
| 2005/0261995 A1 | 11/2005 | Phelan |
| 2007/0039049 A1 | 2/2007 | Kupferman et al. |
| 2008/0181208 A1 | 7/2008 | Maes |
| 2009/0041011 A1 | 2/2009 | Sheppard |
| 2009/0204817 A1 | 8/2009 | Deana-Roga et al. |
| 2009/0254650 A1 | 10/2009 | Sheppard |
| 2009/0254651 A1 | 10/2009 | Sheppard |
| 2010/0281159 A1 | 11/2010 | Boscolo et al. |
| 2010/0296402 A1 | 11/2010 | Fraccalvieri et al. |
| 2011/0032821 A1 | 2/2011 | Morrill et al. |
| 2011/0060838 A1 | 3/2011 | Yeung et al. |
| 2011/0202588 A1 | 8/2011 | Aggarwal et al. |
| 2012/0323749 A1* | 12/2012 | Lapidus ............... G06Q 40/123 705/31 |

OTHER PUBLICATIONS

Corresponding PCT Application No. PCT/CA2011/001012, International Search Report and Written Opinion, dated May 17, 2012.
Corresponding PCT Application No. PCT/CA2011/001012, International Preliminary Report on Patentability, dated Jan. 31, 2014.
Examination Report dated Nov. 18, 20113 for Canadian Patent Application No. 2848425.
Extended European Search Report dated Feb. 4, 2016 for European Patent Application No. 12882523.9.
Extended European Search Report dated Dec. 16, 2015 for European Patent Application No. 13797896.1.
EPO, Summons to attend oral proceedings pursuant to Rule 115(1) EPC, dated Aug. 14, 2017, re European Patent Application No. 11872173.7.
CIPO, Examination Report, dated Aug. 29, 2018, re Canadian Patent Application No. 2848425.

* cited by examiner

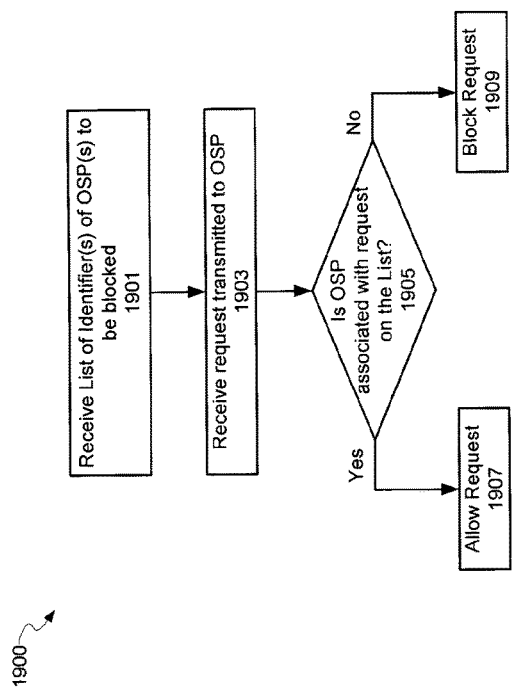

INTERMEDIATION SERVER FOR CROSS-JURISDICTIONAL INTERNET ENFORCEMENT

FIELD

The specification relates generally to intermediation servers, and specifically to an intermediation server for cross-jurisdictional internet enforcement.

BACKGROUND

On-line transactions are increasingly cross-jurisdictional and/or international. Collecting tax, and/or enforcing jurisdictional requirements on such transactions can be extremely difficult as the tax authorities and/or legal authorities must often rely on the on-line sales presence to provide reports of transactions.

SUMMARY

A first aspect of the specification provides an intermediation server comprising: a processor and a communication interface, the processor enabled to enabled to receive data indicative of on-line communications between at least one communication device and at least one on-line sales presence, determine that the data indicative of the on-line communications is associated with legal data associated with the on-line sales presence and when the legal data meets a given criteria, trigger remedial legal action.

The processor can be further enabled to index the data such that the data can be referenced in determining associations with the legal data.

The legal data can comprise tax submissions associated with the on-line sales presence, the given criteria can comprise the tax submissions being less than a given threshold of tax collected from the on-line sales presence and the remedial legal action can comprise triggering an audit of the at least one on-line sales presence. The tax submissions can comprise respective tax submissions for respective jurisdictions, the given criteria can further comprise jurisdictional criteria each comprising at least one of the respective tax submissions being less than a respective given threshold of respective tax collected from the on-line sales presence for each of the respective jurisdictions and, the remedial legal action can further comprise triggering the audit of the at least one on-line sales presence for the respective jurisdiction where the jurisdictional criteria is met. The processor can be further enabled to cause the tax submissions to be collected by one or more of taking over the on-line communications, participating in the on-line communications and injecting a message into the on-line communications. The processor can be further enabled to determine a tax authority associated with the tax submissions and remit the tax submissions to the tax authority. The processor can be further enabled to cause the tax collections to be collected by receiving authorization from the at least one communications device for a credit card company to add sales tax to a bill for at least one on-line transaction associated with the on-line communications.

The processor can be further enabled to communicate at least a portion of the legal data to one or more of the at least one communication device and the on-line sales presence by one or more of taking over the on-line communications, participating in the on-line communications and injecting a message into the on-line communications.

The intermediation server can further comprise one or more of at least one interception server for intercepting the on-line communications between the at least one communication device and the at least one on-line sales presence, an aggregator server in communication with the at least one interception server for aggregating interception data received from the at least one interception server and a taxation authority server in communication with at least one of the at least one interception server and the aggregator server.

The data indicative of the on-line communications between the at least one communication device and the at least one on-line sales presence can comprise one or more of transactional data, a payment request from the at least one on-line sales presence, a first indication of one or more on-line communication sessions between the at least one communication device and the at least one on-line sales presence, a second indication of the one or more on-line communication sessions with at least one IP (internet protocol) address associated with the at least one on-line sales presence and a third indication of one or more encrypted on-line communication sessions with the at least one IP address associated with the at least one on-line sales presence.

The remedial legal action can comprise one or more of blocking communications with the at least one on-line sales presence, collecting tax from one or more of the at least one communication device and the at least one on-line sales presence, collecting authorization to collect tax from one or more of the at least one communication device and the at least one on-line sales presence and remitting collected tax to at least one tax authority.

The legal data can comprise an injunction against the at least one on-line sales presence, the given criteria can comprise when the injunction is in place, the on-line sales presence is to be prevented from providing services in at least one jurisdiction and the remedial legal action can comprise blocking communications with the at least one on-line sales presence in the at least one jurisdiction.

Another aspect of the specification provides a method comprising: receiving, at a processor of an intermediation server and via a communication interface, data indicative of on-line communications between at least one communication device and at least one on-line sales presence; determining, at the processor, that the data indicative of the on-line communications is associated with legal data associated with the on-line sales presence; and triggering, at the processor, remedial legal action when the legal data meets a given criteria.

The method can further comprise indexing the data at the processor such that the data can be referenced in determining associations with the legal data.

The legal data can comprise tax submissions associated with the on-line sales presence; the given criteria can comprise the tax submissions being less than a given threshold of tax collected from the on-line sales presence; and, the remedial legal action can comprise triggering an audit of the at least one on-line sales presence. The tax submissions can comprise respective tax submissions for respective jurisdictions; The given criteria can further comprise jurisdictional criteria each comprising at least one of the respective tax submissions being less than a respective given threshold of respective tax collected from the on-line sales presence for each of the respective jurisdictions; and, the remedial legal action can further comprise triggering the audit of the at least one on-line sales presence for the respective jurisdiction where the jurisdictional criteria is met.

The method can further comprise causing, at the processor, the tax submissions to be collected by one or more of taking over the on-line communications; participating in the on-line communications and injecting a message into the on-line communications. The method can further comprise determining, at the processor, a tax authority associated with the tax submissions and remitting the tax submissions to the tax authority. The method can further comprise causing, at the processor, the tax collections to be collected by receiving authorization from the at least one communications device for a credit card company to add sales tax to a bill for at least one on-line transaction associated with the on-line communications.

The method can further comprise communicating, at the processor and via the communication interface, at least a portion of the legal data to one or more of the at least one communication device and the on-line sales presence by one or more of taking over the on-line communications; participating in the on-line communications and injecting a message into the on-line communications.

The method can further comprise: intercepting, at the processor via the communication interface, the on-line communications between the at least one communication device and the at least one on-line sales presence; aggregating, at the processor, the intercepted on-line communications between the at least one communication device and the at least one on-line sales presence; and communicating, at the processor via the communication interface, the aggregated, intercepted on-line communications between the at least one communication device and the at least one on-line sales presence to a taxation authority.

The data indicative of the on-line communications between the at least one communication device and the at least one on-line sales presence can comprise one or more of: transactional data; a payment request from the at least one on-line sales presence; a first indication of one or more on-line communication sessions between the at least one communication device and the at least one on-line sales presence; a second indication of the one or more on-line communication sessions with at least one IP (internet protocol) address associated with the at least one on-line sales presence; and a third indication of one or more encrypted on-line communication sessions with the at least one IP address associated with the at least one on-line sales presence.

The remedial legal action can comprise one or more of: blocking communications with the at least one on-line sales presence; collecting tax from one or more of the at least one communication device and the at least one on-line sales presence; collecting authorization to collect tax from one or more of the at least one communication device and the at least one on-line sales presence; and remitting collected tax to at least one tax authority.

The legal data can comprise an injunction against the at least one on-line sales presence; the given criteria can comprise when the injunction is in place, the on-line sales presence is to be prevented from providing services in at least one jurisdiction; and the remedial legal action can comprise blocking communications with the at least one on-line sales presence in the at least one jurisdiction.

BRIEF DESCRIPTIONS OF THE DRAWINGS

For a better understanding of the various implementations described herein and to show more clearly how they may be carried into effect, reference will now be made, by way of example only, to the accompanying drawings in which:

FIG. 19 depicts a method for blocking access to an on-line service provider, according to non-limiting implementations.

DETAILED DESCRIPTION

Figure 1:
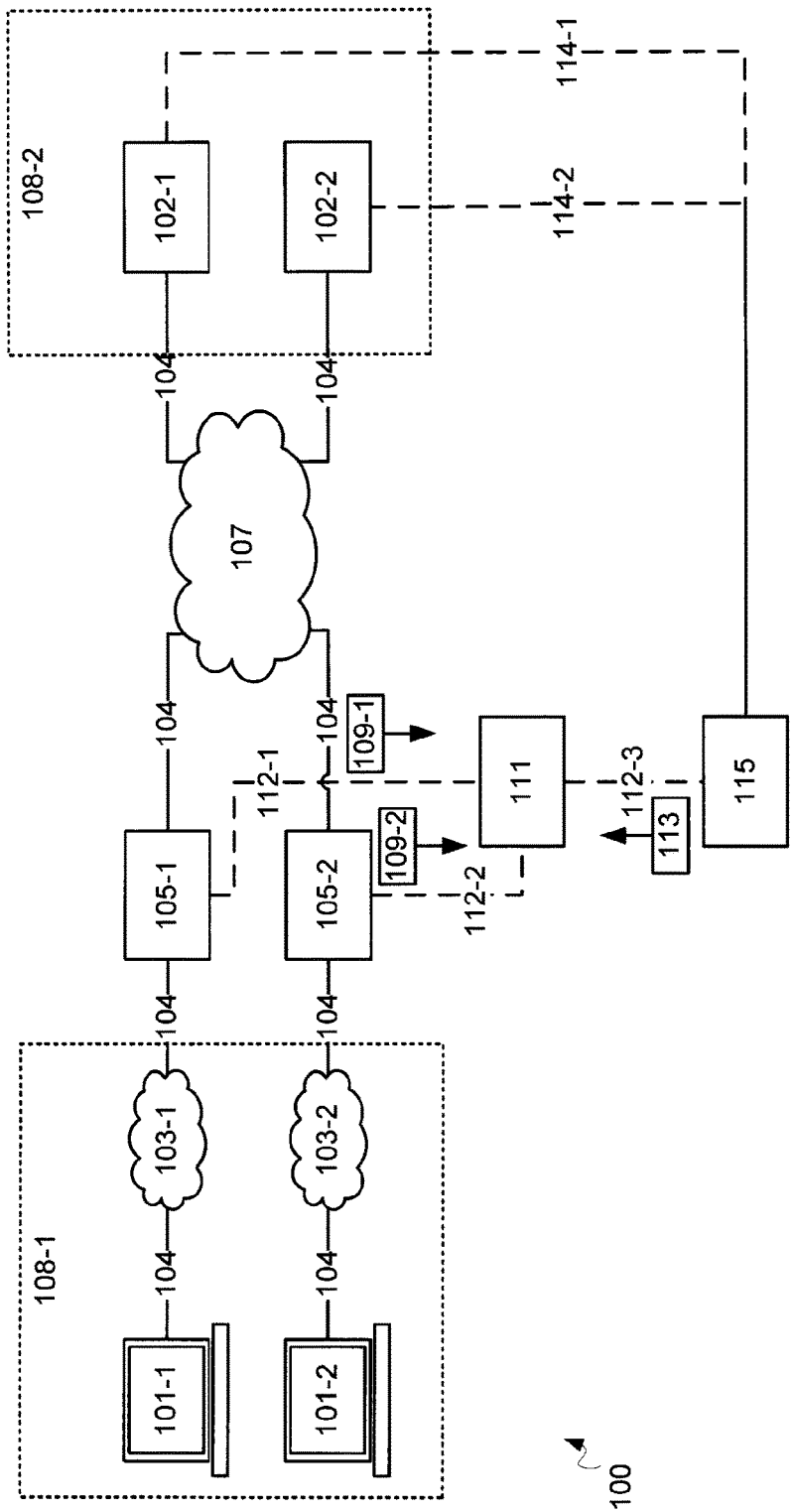
FIG. 1 depicts a system for cross-jurisdictional internet enforcement, according to non-limiting implementations.

FIG. 1 depicts a system 100 for cross jurisdictional internet enforcement, accord to non-limiting implementations. System 100 comprises at least one communication device 101-1, 101-2, each in communication with one or more on-line sales presence (OSP) 102-1, 102-2 via respective business service provider networks 103-1, 103-2, respective interception servers 105-1, 105-2, and a general communications network 107, such as the Internet or the like. Communication devices 101-1, 101-2, will be generically referred to hereafter as a device 101, and collectively as devices 101. This convention will be used throughout the specification. Each device 101 comprises a communication device that subscribes to respective service provider networks 103 to access network 107, and to thereafter access various on-line services, such as OSPs 102. It is appreciated that devices 101, OSPs 102, networks 103, 107, and servers 105 are all in communication via links 104.

It is appreciated that, in some implementations, devices 101 and OSPs 102 can be in different legal jurisdictions, international or otherwise. For example, a device 101 can be in a first jurisdiction 108-1, such as a first state or country, an OSP 102 can be in a second jurisdiction 108-2, such as a second state or country. In order for a tax authority associated with jurisdiction 108-1, to collect taxes from on-line transactions between device 101 and OSP 102, the tax authority must rely on an OSP 102 to voluntarily submit reports, and even then it can be difficult to collect tax reliably.

A similar situation occurs for a variety of other legal situations. For example, if an OSP 102 in jurisdiction 108-2 has been barred from selling a product and/or offering services (such as on-line gambling) in jurisdiction 108-1, it can be challenge to prevent a device 101 in jurisdiction 108-1 from communicating with an OSP 102 to access those services.

To address this situation, data 109 indicative of on-line communications between a device 101 and an OSP 102 can be collected at interception servers 105, and provides to an aggregator 111 in communication with each interception server 105 and legal entity 115 via respective links 112. Links 112 are drawn in dashed lines for clarity only. Aggregator 111 can store and/or index data 109 in order to determine that data 109 is associated with legal data 113, that is in turn associated with an OSP 102. For example, legal data 113 can comprise data representative of tax submissions received at a legal entity 115, such as a tax authority associated with jurisdiction 108-1. When legal data 113 meets a given criteria, such as the tax submissions being lower than a given threshold value, remedial legal action can be triggered, such as an audit of an OSP 102 by legal entity 115. This process will be described in more detail below. It is appreciated, however, that legal data 113 can be received at legal entity 115 via links 114 with OSPs 102.

Figure 2:
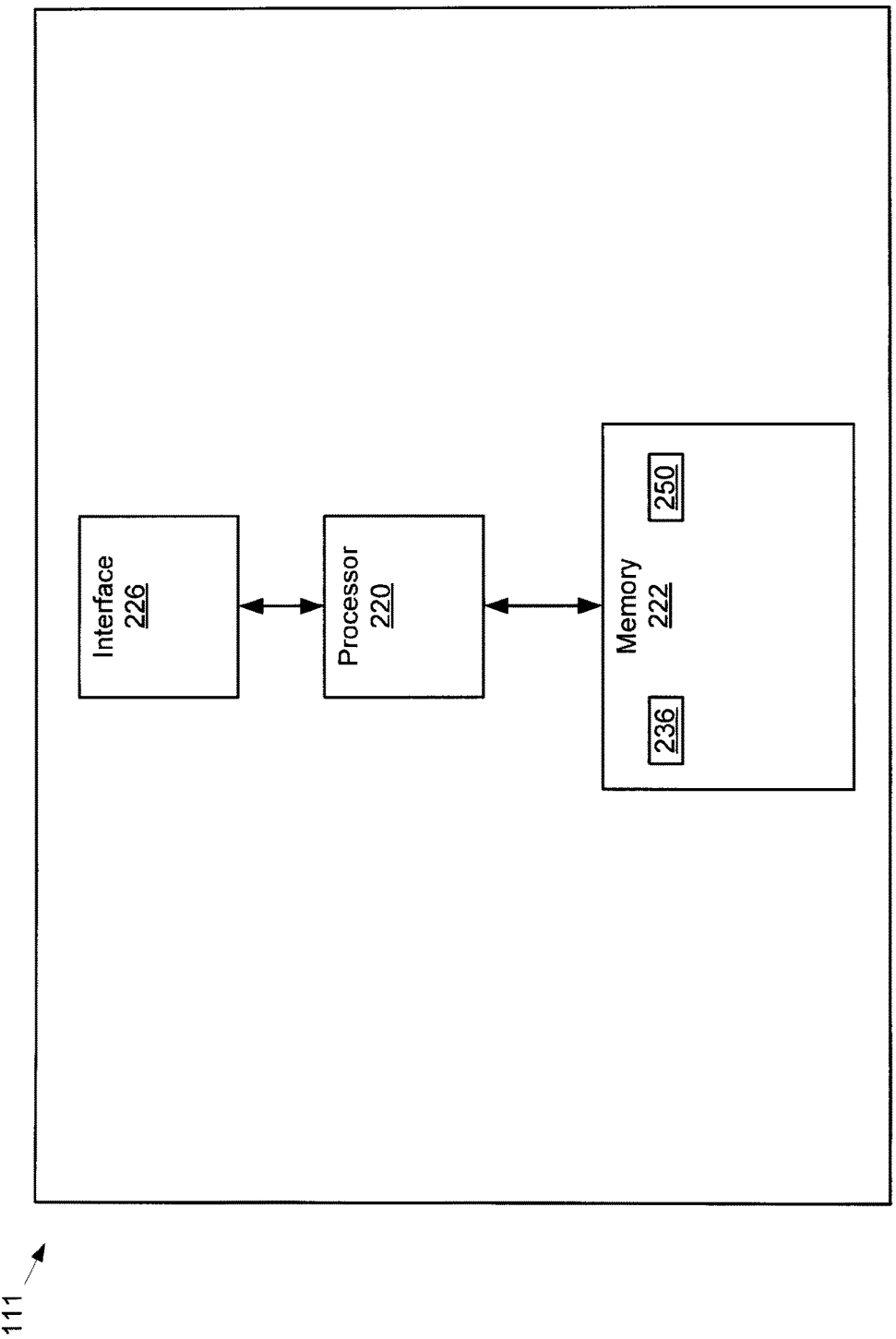
FIG. 2 depicts an aggregator intermediation server, according to non-limiting implementations.

Attention is now directed to FIG. 2, which depicts aggregator 111. It is appreciated that aggregator 111 can comprise an intermediation server, which comprises a processor 220 interconnected with memory 222, and a communication interface 226. Aggregator 111 can be based on any well-known server environment including a module that houses one or more central processing units, volatile memory (e.g. random access memory), persistent memory (e.g. hard disk devices) and network interfaces to allow aggregator 111 to communicate over relevant links, such as links 112. For example, aggregator 111 can comprise a ProLiant® Server from Hewlett-Packard Company, 3000 Hanover Street Palo Alto, Calif. 94304-1185 USA having a plurality of central processing units and having several gigabytes of random access memory. However, it is to be emphasized that this particular server is merely exemplary, and a vast array of other types of computing environments for aggregator 111 are contemplated.

Furthermore, it is contemplated that aggregator 111 can be implemented as a plurality of interconnected servers, in a so-called server farm, which are mirrored or otherwise enabled for load balancing or failover or high availability or any or all of those. It is further more appreciated that aggregator 111 can comprise any suitable number of servers that can perform different functionality of server implementations described herein. Those skilled in the art will now recognize that memory 222 is an example computer readable media that can store programming instructions executable on the processors of each server.

Processor 220 comprises any suitable processor, or combination of processors, including but not limited to a microprocessor, a central processing unit (CPU) and the like. Other suitable processing units are within the scope of present implementations.

Processor 220 is enabled to communicate with memory 222, which can comprise one or more of a non-volatile storage unit (e.g. Erasable Electronic Programmable Read Only Memory ("EEPROM"), Flash Memory) and a volatile storage unit (e.g. random access memory ("RAM")). Programming instructions that implement the functional teachings of aggregator 111 as described herein are typically maintained, persistently, in the non-volatile storage unit and used by processor 220 which makes appropriate utilization of the volatile storage unit during the execution of such programming instructions. Those skilled in the art will now recognize that memory 222 is an example of non-transitory computer readable media that can store programming instructions executable on processor 220. It is further appreciated that memory 222 is also an example of memory units and/or memory modules.

Memory 222 can comprise any suitable memory device, including but not limited to any suitable one of, or combination of, volatile memory, non-volatile memory, random access memory (RAM), read-only memory (ROM), hard drive, optical drive, flash memory, magnetic computer storage devices (e.g. hard disks, floppy disks, and magnetic tape), optical discs, and the like. Other suitable memory devices are within the scope of present implementations. In particular, memory 222 is enabled to store application 236, for cross-jurisdictional internet enforcement, for processing by processor 220.

Memory 222 further stores given criteria 250 comprising data for determining when to trigger remedial legal action against a given OSP 102, as will be described in further detail below. Given criteria 250 can be provisioned and/or updated at aggregator 111 at any suitable time.

Communication interface 226 comprises any suitable communication interface, or combination of communication interfaces. In particular interface 226 is enabled to communicate with servers 105 and legal entity 115 via links 112. Accordingly, interface 226 is enabled to communicate according to any suitable protocol including but not limited to wired protocols, wireless protocols, cell-phone protocols, wireless data protocols, Internet protocols, packet-based protocols, analogue, PSTN (public switched telephone network) protocols WiFi protocols, WiMax protocols and/or a combination, or the like. In general, it will be understood that interface 226 is enabled to correspond with the network architecture that is used to implement a respective link 112. (In other implementations a plurality of links 112 with different protocols can be employed for each server 105 and legal entity 115 and thus a plurality of interfaces can be provided to support each link).

From the previous discussion, it should be understood that in general a wide variety of configurations for aggregator 111 are contemplated.

Returning to FIG. 1, each link 112 comprises any suitable link between aggregator 111 and servers 105, and legal entity 11, including any suitable combination of wired and/or wireless links, wired and/or wireless devices and/or wired and/or wireless networks, including but not limited to any suitable combination of USB (universal serial bus) cables, serial cables, wireless links, cell-phone links, wireless data, Bluetooth links, NFC (near field communication) links, WiFi links, WiMax links, packet based links, the Internet, analog networks, the PSTN (public switched telephone network), access points, and the like, and/or a combination. It is further appreciated that links 104 and 114 can be similar to links 112.

Further, each if networks 103, 107 can comprise any suitable combination of wired and/or wireless networks as desired, including but not limited to the Internet, the PSTN (public switched telephone network), analog networks, packet switched networks, WiFi networks, WiMax networks, and the like.

It is appreciated that each of servers 105 can be based on a server environment that can be similar or different to aggregator 111. It is further appreciated that each of servers 105 are enabled to intercept and/or detect on-line communications between devices 101 and OSPs 102, for example by detecting an internet protocol (IP) address associated with packets transmitted to and/or from a respective network 103 and referencing the IP address with a list of IP addresses of OSPs stored in a suitable database, which can be local or remote from a respective server 105. In some implementations, server 105 can be enabled for deep packet inspection to determine whether packets transmitted to and/or from a respective network 103 are associated with an OSP 102 and/or with a transaction (e.g. a sales and/or financial transaction) between a device 101 and an OSP 102. In some implementations, on-line communications between devices 101 and OSPs 102 can be encrypted; in these implementations, server 105 can determine that on-line communications between devices 101 and OSPs 102 have occurred without determining the exact nature of the on-line communications.

In particular non-limiting implementations, it is appreciated that one or more servers 105 comprises one or more edge servers.

In some implementations, it is appreciated that servers 105 can be enabled to implement remedial legal action against an OSP 102, for example by blocking on-line communications to a given OSP 102.

It is further appreciated that legal entity 115 also comprises a server environment that can be similar or different to aggregator 111. In other words, while legal entity 115 comprises computer equipment comprising a server, a processor, memory, a communication interface etc., and any other suitable electronic devices. It is yet further appreciated that legal entity 115 can be enabled to communicate with OSPs 102 via links 114, to electronically receive legal data, such as tax submissions, and/or to take remedial legal action against a given OSP 102, for example to trigger a tax audit. It is appreciated that each of receiving legal data from an OSP 02 and triggering legal action against a given OSP 102 can occur either electronically and/or non-electronically. For example, receiving legal data from an OSP 102 can occur via receiving tax submissions in the mail, while triggering legal action can occur by performing an on-site audit of a business entity associated with a given OSP 102, using accountants, tax professionals, legal professionals or the like. In some implementations, each of receiving legal data from an OSP 02 and triggering legal action against a given OSP 102 can occur via a combination of electronic and non-electronic methods: for example, triggering legal action can initially occur electronically by electronic notification of a given OSP 102 of a tax audit, and then at least partially non-electronically by tax professionals performing the on-site audit using electronic auditing means and/or methods. Similarly, tax submissions can be received non-electronically via mail, but then entered into an electronic database (not depicted) associated with legal entity 115 such that an electronic copy of the tax submissions can be accessed and/or processed.

It is yet further appreciated that the functionality of servers 105, aggregator 111 and legal entity 115 can be combined in any suitable combination of servers. In other words, while servers 105, aggregator 111 and legal entity 115 are depicted as separate devices in FIG. 1, their functionality can be combined in any suitable combination. For example the functionality of aggregator 111 can be combined with one or more of servers 105 and/or with legal entity 115. Indeed, the functionality of all of servers 105, aggregator 111 and legal entity 115 can be combined into one server. In present implementations, however, it is appreciated that an entity operating aggregator 111 and/or servers 105 can provide cross-jurisdictional internet enforcement services to legal entity 115 and/or any suitable number of legal entities associated with the same or different jurisdictions.

It is yet further appreciated that each of OSPs 102 can be can be based on a server environment that can be similar or different to aggregator 111, each OSP 102 enabled to provide on-line services such as selling good or services via links 104.

It is further appreciated that devices 101 can comprise and suitable combination personal computers, laptop devices, mobile electronic devices, portable communication devices, cell phones, personal digital assistants, smart phones, tablet devices and the like, and can we wired or wireless as desired, with respective links 104 between devices 101 and networks 103 being suitably enabled. Many well known computing devices, or variants thereof, are suitable for present implementations.

It is yet further appreciated that while only two devices 101 and two networks 103 are depicted in FIG. 1, system 100 can comprise any suitable number of devices 101 and any suitable number of networks 103. Furthermore, each network 103 can be associated with any suitable number of devices 101; for example, as each network 103 is a business service provider network, each business service provider can be providing a respective network for thousands to millions of subscribers, each of which can be associated with one or more devices 101, such that system 100 comprises thousands to millions of devices 101.

It is yet further appreciated that while only two OSPs 102 are depicted in FIG. 1, system 10 can comprise any suitable number of OSPs 102. For example, any website offering good or services for sale can be an OSP, and hence system 100 can comprise thousands to millions of OSPs.

Indeed, it is appreciated that system 100 can be scaled to any suitable number of devices 101 and any suitable number of OSPs. Furthermore, it is appreciated that any suitable number of devices 101 associated with any suitable number of networks 103 can access any given OSP 102, with data 109 indicative of any suitable number of on-line communications 109 being generated and transmitted to aggregator 111.

Figure 3:
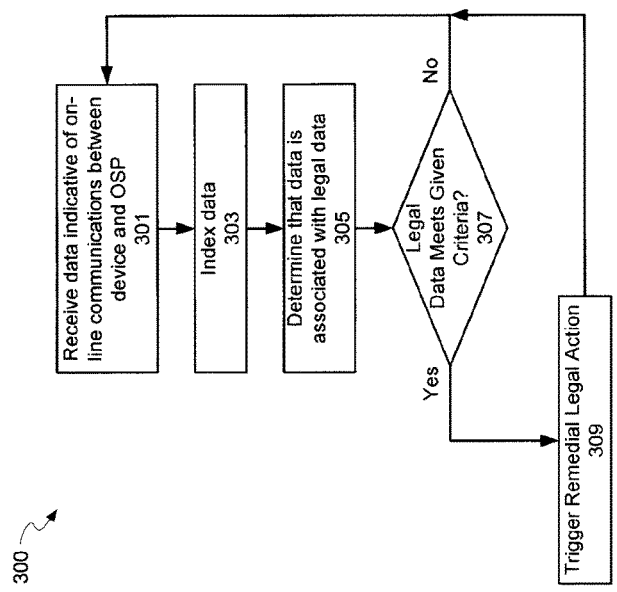
FIG. 3 depicts a method for cross-jurisdictional internet enforcement, according to non-limiting implementations.

Attention is now directed to FIG. 3 which depicts a method 300 for cross-jurisdictional internet enforcement. In order to assist in the explanation of method 300, it will be assumed that method 300 is performed using system 100. Furthermore, the following discussion of method 300 will lead to a further understanding of system 100 and its various components. However, it is to be understood that system 100 and/or method 300 can be varied, and need not work exactly as discussed herein in conjunction with each other, and that such variations are within the scope of present implementations.

Figure 4:
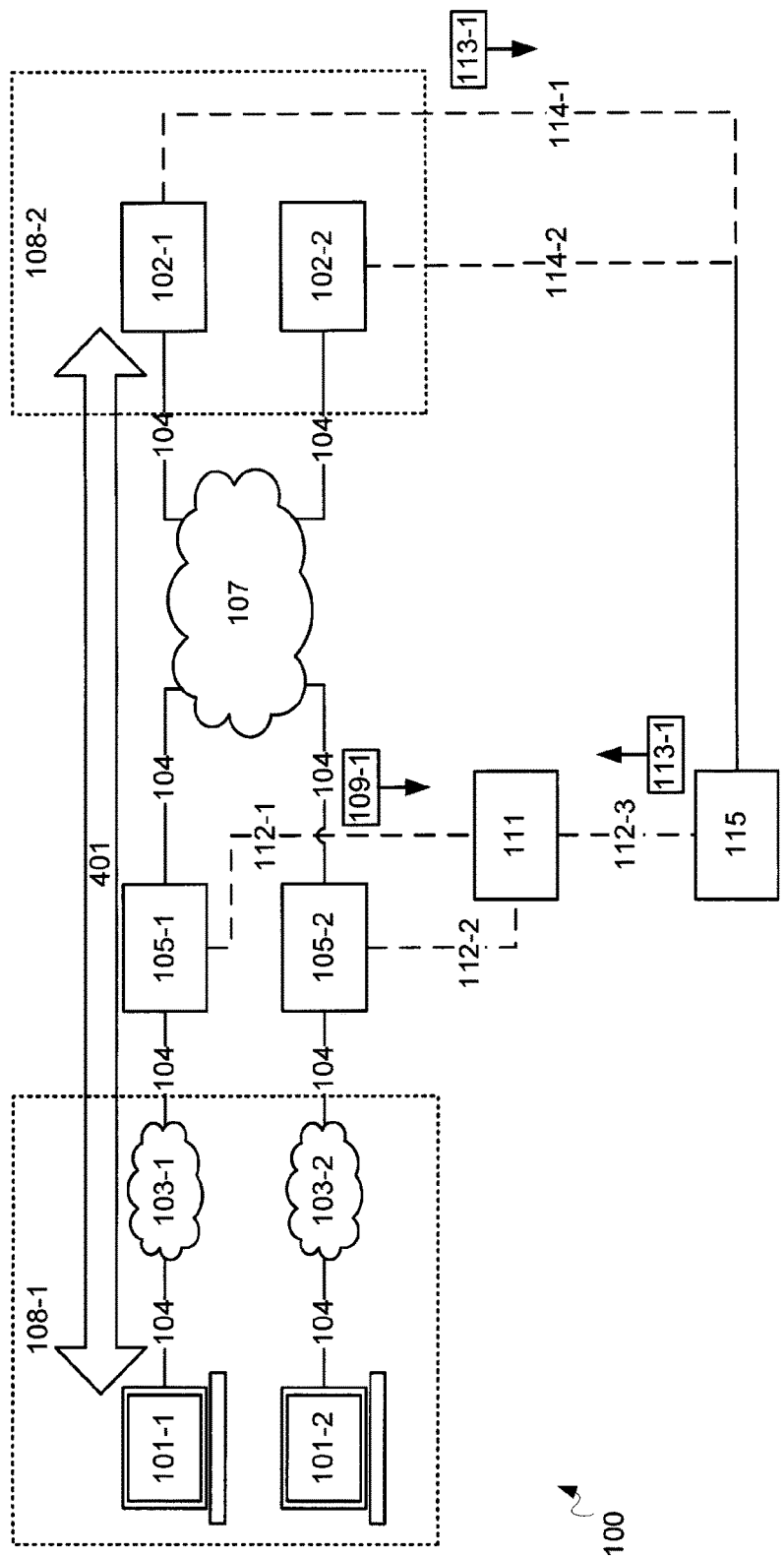
FIG. 4 depicts a system for cross-jurisdictional internet enforcement, according to non-limiting implementations.

Method 300 will also be described with reference to FIGS. 4, 6 and 7 which are each substantially similar to FIG. 1, with like elements having like numbers, and FIG. 5, which is substantially similar to FIG. 2, with like elements having like numbers.

In particular, it is appreciated that method 300 can be implemented at aggregator 111, for example via processor 220 processing application 236, though it is further appreciated that, in implementations where functionality of aggregator 111 is combined with one or more of servers 105 and legal entity 115, method 300 can be implemented at any suitable combination of aggregator 111, servers 105 and legal entity 115.

It is yet further appreciated that method 300 assumes that an on-line communications session 401 between at least one device 101 (such as device 101-1) and at least one OSP 102 (such as OSP 102-1) has occurred and/or is occurring. It is furthermore assumed that server 105 has detected communications 401 and transmitted data 109-1, indicative of on-line communications between device 101-1 and OSP 102-1, to aggregator 111, as depicted in FIG. 4.

At block 301, aggregator 111 receives data 109-1 indicative of on-line communications between at least one communication device 101-1 and at least one OSP 102-1. For example, aggregator 111 can receive data 109-1 via interface 226. Data 109-1 generally indicates that communications 401 have occurred and can comprise any suitable format and/or content, including but not limited to an identifier of OSP 102-1 (including but not limited to an IP address of OSP 102-1), an identifier of device 101-1 (including but not limited to an IP address of device 101-1), a date and time of communications 401, a duration of communications 401, data indicating the nature of communications 401 (i.e. a flag, or the like, that a transaction occurred in communications 401), and/or data from communications 401 (including but not limited to data associated with a transaction within communications 401, such as an amount of money being exchanged).

It is appreciated that data 109 can comprise one or more of transactional data; a payment request from a given OSP 102; an indication of one or more on-line communication sessions between one or more of devices 101 the given OSP 102; an indication of the one or more on-line communication sessions with at least one IP (internet protocol) address associated with the given OSP 102; and, a third indication of one or more encrypted on-line communication sessions with the at least one IP address associated with the given OSP 102.

It is appreciated that a server 105 can be enabled to automatically transmit data 109 whenever an on-line communication has occurred and/or after a given time period after an on-line communication has occurred. For example, a given on-line communication, such as communication 401 can comprise numerous exchanges of data between a device 101 and an OSP 102. In some implementations, data 109 can be transmitted to aggregator 111 each time a data exchange occurs; in these implementations data 109 can be transmitted serially such that, for example, data 109-1 comprises a plurality of indications of communications 401.

In other implementations, server 105 can determine a first instance of a data exchange between a device 101 and an OSP 102, and monitor data exchanged within, for example, communications 491 thereafter; once a given period of time has occurred after a last instance of a data exchange between a device 101 and an OSP 102, data 109 can be generated and transmitted to aggregator 111.

In some implementations, server 105 can transmit data 109 when a number of data exchanges is above a given threshold number and/or a duration of on-line communications is above a given threshold time period. In other words, when a number of data exchanges is below a given threshold number and/or a duration of on-line communications is below a given threshold time period, server 105 assumes that site browsing is occurring. When a number of data exchanges is above a given threshold number and/or a duration of on-line communications is above a given threshold time period, server 105 assumes there that a transaction can have occurred (i.e. the website of an OSP 102 is first browsed and then a purchase is made).

Alternatively, server 105 can transmit data 109 to aggregator 111 after server 105 detects that data exchanges between a device 101 and an OSP 102 have changed from unencrypted to encrypted, which is likely indicative of a change from site browsing to an occurrence of a transaction (i.e. the website of an OSP 102 is first browsed without encryption and then a purchase is made with encryption).

Figure 5:
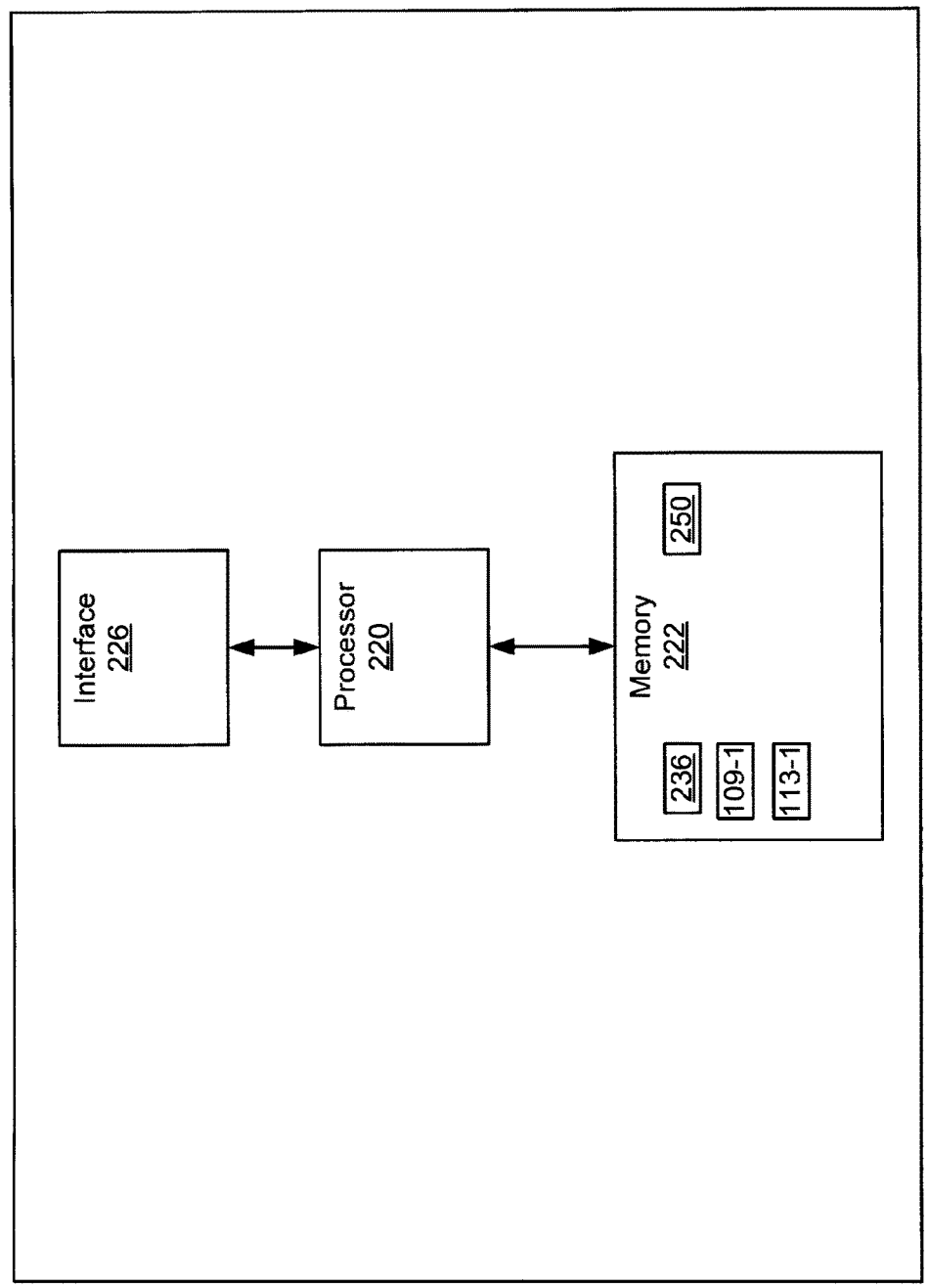
FIG. 5 depicts an aggregator intermediation server, according to non-limiting implementations.
Figure 6:
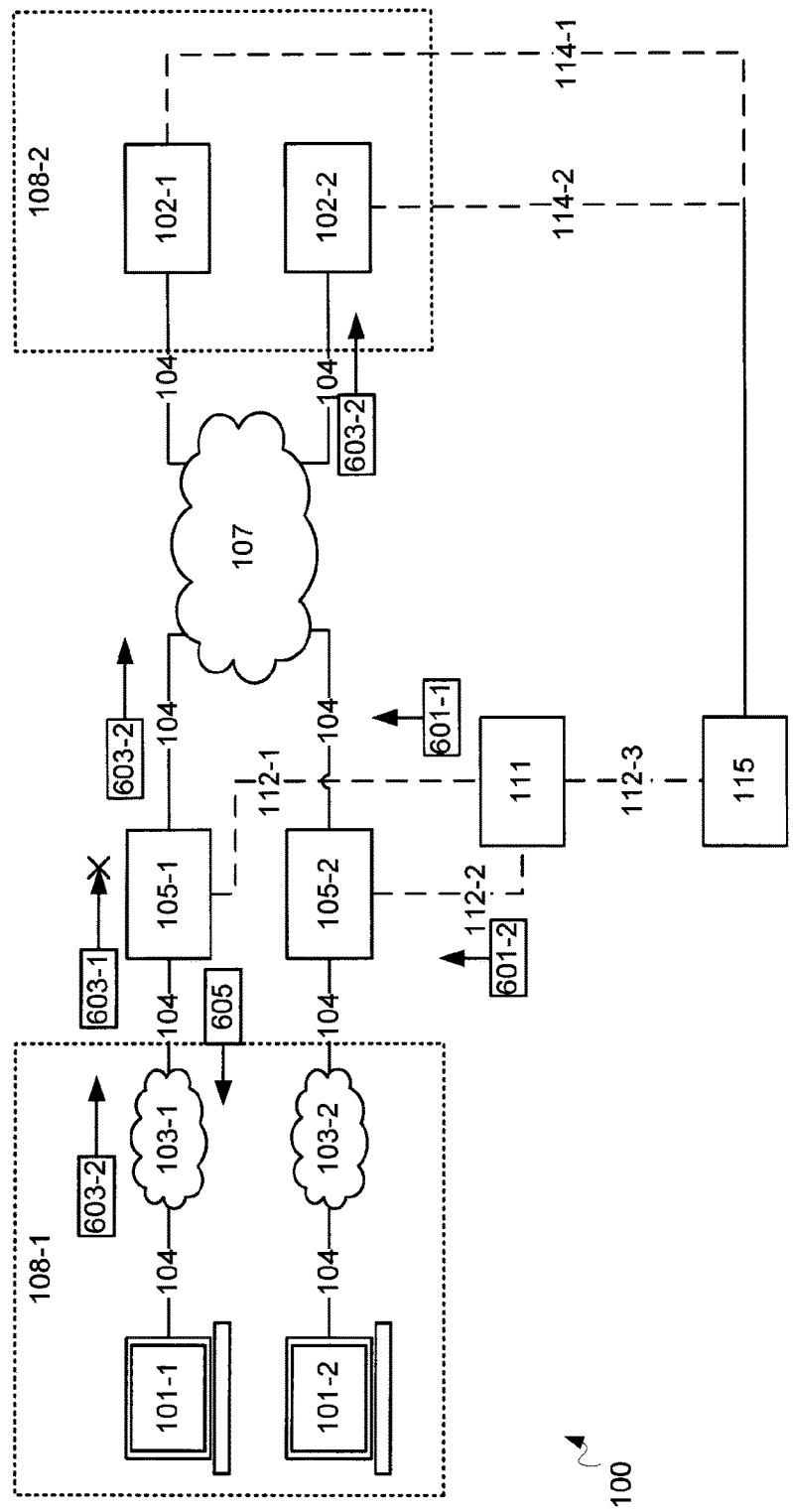
FIGS. 6 to 9 depict systems for cross jurisdictional internet enforcement, according to non-limiting implementations.

At block 303, aggregator 111 indexes data 109-1, such that data 109-1 can be referenced in determining associations with legal data for example by storing data 109-1 at memory 222 as depicted in FIG. 5. In other implementations, data 109-1 can be stored in a database associated with aggregator 111 (not depicted); such a database can be local or remote to aggregator 111.

At block 305, aggregator 111 determines data 109-1 is associated with legal data 113-1, which is in turn associated with OSP 102-1. For example, returning to FIG. 4, legal data 113-1 can be received at legal entity 115, and thereafter indexed and/or stored in association with an identifier of OSP 102-1, including but not limited to an IP address of OSP 102-1. Aggregator 111 can determine that data 109-1 is associated with legal data 113-1 by requesting any legal data associated with OSP 102-1 from legal entity 115. For example, such a request can be triggered by receipt of data 109-1 and/or periodically and/or after receiving a threshold number of indications that on-line communications have occurred with OSP 102-1 and/or using any other suitable criteria. In some implementations, aggregator 113 can first check whether any legal data 113 associated with OSP 102-1 is stored at memory 222 (and/or an associated database); if legal data 113-1 is already stored at memory 22 (and/or an associated database), an update to legal data 113-1 can be requested rather than an entirely new copy of updated legal data 113-1; in some implementations, updates to legal data 113-1 and/or updated legal data 113-1 are requested only when legal data 113-1 stored at memory 222 (and/or an associated database) is older than given threshold period of time.

Implementations where legal data 115 is requested when a threshold number of indications that on-line communications have occurred with OSP 102-1 causes legal data 113-1 to be requested when a suitable number of on-line communications have occurred with OSP 102-1, for example enough on-line communications with any suitable number of devices 101 in a given jurisdiction, such as jurisdiction 1081, to determine whether legal action against OSP 102-1 could be considered, such as a tax audit. It is appreciated that the on-line communications can be for any on-line communications with a given OSP 102-1 and not specifically limited to on-line communications between a given OSP 102-1 and a specific device 101.

It is furthermore appreciated that an association between data 109 and legal data 113 can be made via an identifier of an associated OSP 102, including but not limited to an IP address.

In any event, once data 109-1 and legal data 113-1 are received at aggregator 111, as depicted in FIG. 5, at least legal data 113-1 is processed by processor to determine whether legal data 113-1 meets given criteria 250, as shown at block 307 of FIG. 3.

Given criteria 250 comprises data for determining when to trigger remedial legal action against a given OSP 102. Given criteria 250 comprise one or more conditions for triggering remedial legal actions. For example, given criteria 250 can comprise a condition for triggering remedial legal action against a given OSP 102 when there is a discrepancy between data 109 and legal data 113. For example, in some implementations, data 109 can be indicative of an amount of tax that should have been collected in a given transaction and/or plurality of transactions, and an amount of tax that was remitted to legal entity 115 as indicated in legal data 113. Such a comparison can be made when data 109 comprises deep packet inspection data from communications 401 such that an amount of tax collected during communications 401 can be determined.

In other implementations, given criteria 250 can comprise whether a number of on-line communications with a given OSP 102 are commensurate with an amount of tax collected from the given OSP 102, as indicted in legal data 113. For example, when a number of on-line communications with a given OSP 102 is above a threshold number, legal data 113 can be processed to determine whether or not an amount of tax collected from OSP 102 is above or below a threshold amount associated with the threshold number of on-line communications: when above, no remedial legal action is triggered, when below, remedial legal action is triggered. Such criteria can be used when on-line communications associated with a given OSP 102 are encrypted such that an amount of tax collected cannot be determined. For example, an estimate of how much tax should have been collected can be determined by associating each on-line communication with a given estimate of amount of tax that may have been collected and multiplying by the number of on-line communications. The given estimate of amount of tax that may have been collected during an on-line communication can be based on past tax submissions from the given OSP 102 and/or estimates based on costs of products/services offered on an associated website. Where the cost of the products/services offered on the associated website vary, the estimates can represent an average amount of tax that could collected when the products/services offered on the associated website are purchased; and/or the estimates can be weighted based on historical purchase trends at the website and/or based on given numbers of products in given price ranges. Indeed, any suitable method can be used to determine such estimates.

In any event, when legal data 113 does not meets given criteria 250 at block 307, block 301 is re-executed and/or processor 220 wait for new data 109 to be received. In other words, no remedial legal action is triggered.

However, when legal data 113 meets given criteria 250 at block 307, at block 309 remedial legal action is triggered, including but not limited to: blocking communications with the given OSP 102; collecting tax from one or more of a given device 101 and a given OSP 102; collecting authorization to collect tax from the given device 101 and the given OSP 102; and remitting collected tax to at least one tax authority.

For example, communications with a given OSP 102 can be blocked when tax submissions are below a given threshold value and/or when OSP 102 is in arrears on tax submissions. In these implementations, with reference to FIG. 6, aggregator 111 can transmit a request 601 to each server 105 to block communications with a given OSP 102, for example OSP 102-1. Thereafter, transmissions 603-1 from a device 101, such as device 101-1, to OSP 102-1 are blocked at each server 105, while transmissions to other OSPs 102 (such as OSP 102-2) are not blocked. In some of these implementations, when a server 105 blocks transmissions 603-1, server 105 transmits a response 605 back to device 101-1 which originated transmissions 603-1 indicating that access to OSP 102-1 has been blocked for legal reasons such as non-payment of taxes or the like. In some of these implementations, transmissions to OSP 102-1 can be blocked for other legal reasons, such as jurisdictional injunctions against OSP 102-1. In any event, thereafter, device 101-1 can display a message at a suitable display device (i.e. in a browser window) showing the legal reason that access to OSP 102-1 has been blocked. For example, a message such as the following can be displayed:

"ACCESS TO THIS ON-ONE SERVICE PROVIDER HAS BEEN BLOCKED FOR LEGAL REASONS BY A GOVERNMENT AGENCY, SUCH AS NON-PAYMENT OF TAXES AND/OR A LEGAL INJUNCTION"

In this manner, a user of device 101 will learn that while access to a given OSP 102 has been blocked, it is not the business service provider associated with a network 105 that is blocking access to the given OSP 102. Such a message will reduce complaints to the business service provider when users find access to a given OSP 102 blocked.

Methods for blocking access to OSPs 102 are described in more detail below with reference to FIGS. 18 and 19.

Figure 7:
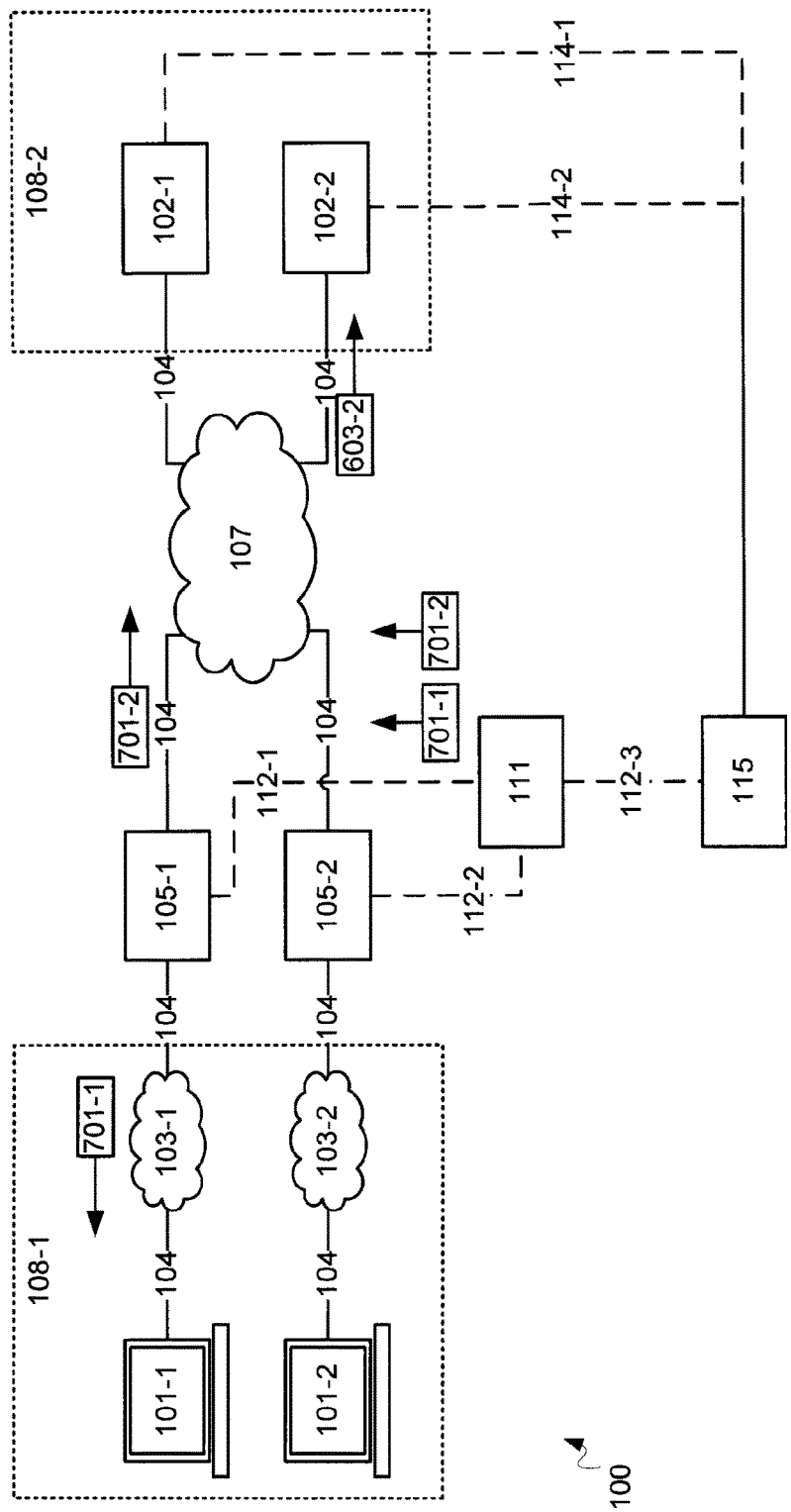

In implementations where tax is collected from one or more of a given device 101 and a given OSP 102, with reference to FIG. 7, aggregator 111 (and/or legal authority 115) can transmit a request 701 to one or more of device 101-1 and OSP 102-1 to remit tax associated with given on-line communications between device 101-1 and OSP 102-1. Requests 701 can be transmitted via suitable servers 105 and/or via direct links with networks 103, 107.

In implementations where collecting authorization to collect tax from the given device 101 and the given OSP 102 occurs, the authorization can be for a given credit card entity to collect the appropriate tax. For example, attention is directed to FIG. 8, which is substantially similar to FIG. 1, with like elements having like numbers, though with an "a" appended thereto. It is assumed that on-line communications 801 between device 101a-1 and OSP 102a-1 has been detected and block 309 of method 300 has been implemented to trigger remedial legal action. System 100a further includes a credit card entity 802 enabled to communicate with servers 105a, devices 101a and/or OSPs 102a via network 107a and a link 804. It is appreciated that credit card entity 802 comprises a server environment which can be similar or different from aggregator 111, and that link 804 can be similar or different from links 104. In other implementations, credit card entity 802 can be enabled to communicate via one of networks 103a rather than network 107a.

Figure 8:
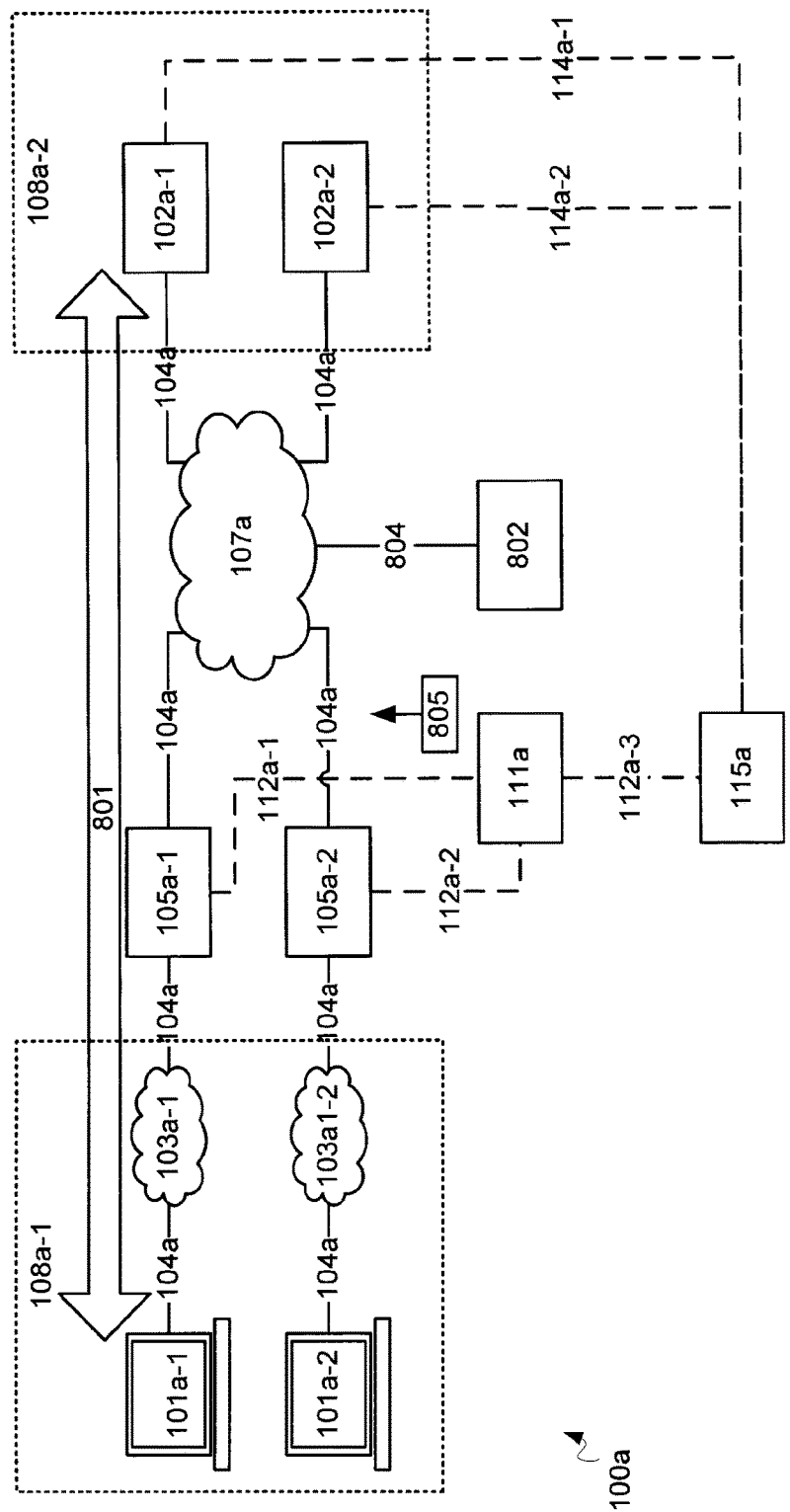
Figure 9:
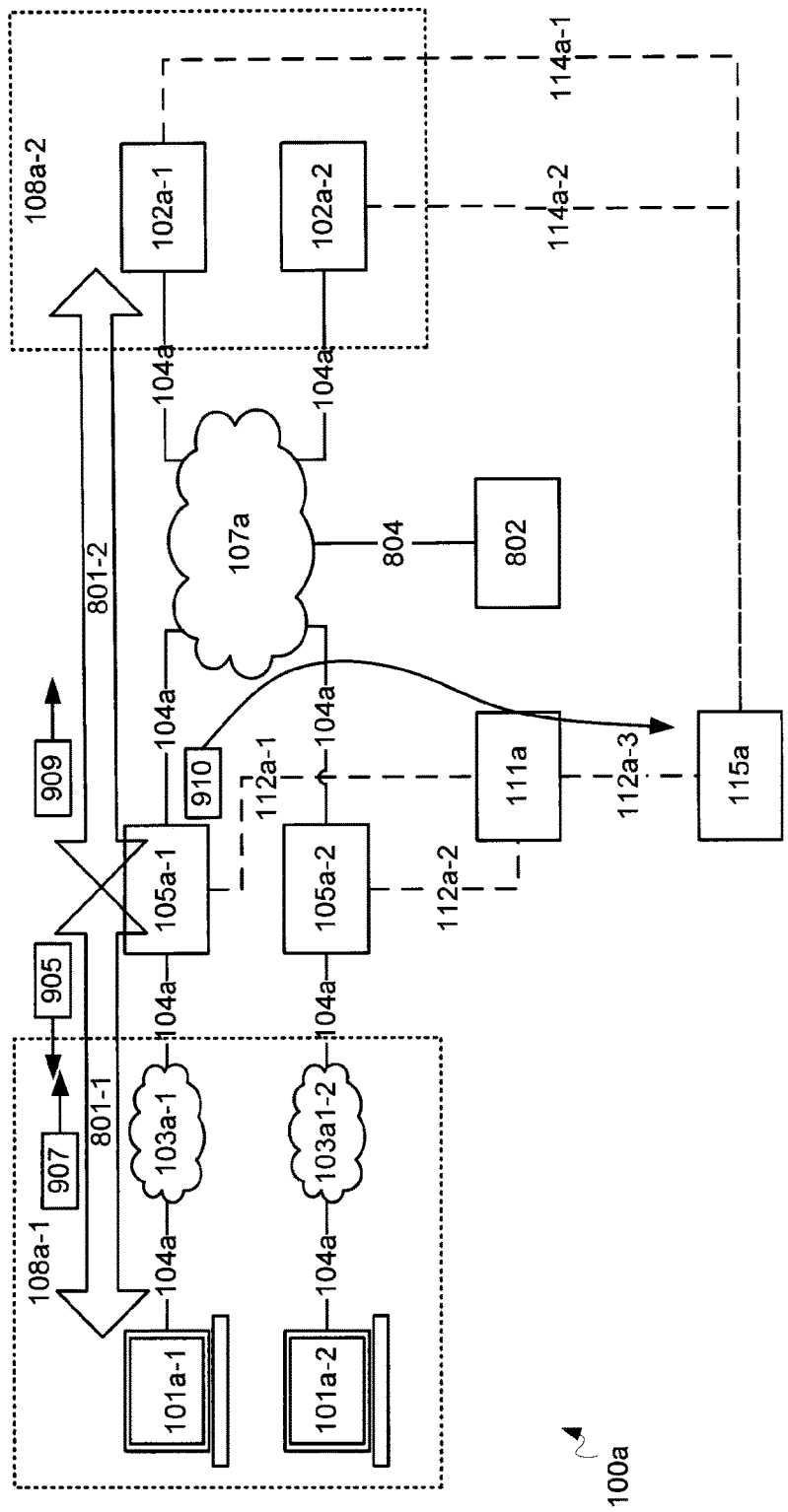

In any event, to trigger remedial legal action, aggregator 111a can be enabled to transmit a request 805 to server 105a-1, which triggers server 105a-1 to take over communications 801 as depicted in FIG. 9, substantially similar to FIG. 8, with like elements having like numbers. However, in FIG. 9, server 105a intercepts communications between device 101a-1 and OSP 108a-2 to effectively split on-line communications 801 into communications 801-1, 801-2 respectively between device 101a-1 and server 105a-1, and server 105a-1 and OSP 102a-1. Within at least one of communication 801-1, 801-2, server 105a-1 transmits a request to at least one of device 101a-1 and OSP 102a-1 to collect authorization for credit card entity 802 to collect tax on any transaction that might occur between device 101a-1 and OSP 102a-1.

Figure 10:
FIG. 10 depicts a graphic user interface (GUI) for cross-jurisdictional internet enforcement, according to non-limiting implementations.

For example, as depicted, server 105a-1 can transmit a message to 905 to device 101a-1 which causes device 101a-1 to provide a message in Graphic User Interface (GUI) 1000 similar to that depicted in FIG. 10. GUI 1000 comprises a message to collect authorization to collect taxes via credit card entity 802. A user fills in credit card information and checks a tickbox 1001 (or the like) authorizing credit card entity 802 to collect taxes on any transactions that might occur between device 101a-1 and OSP 102a-1 in communications 801. Returning to FIG. 9, once a reply 907 to message 905 is received at server 105a-1, reply 907 comprising credit card information and authorization to collect taxes, a message 909 is transmitted to OSP 102a-1 comprising the credit card information and authorization. In some implementations, a message 910 can also be transmitted to legal entity 115a (e.g. via aggregator 111a) to inform legal entity 115a of the transaction and/or possible transaction. In yet further implementations, server 105a-1 can also transmit a message (not depicted) to credit card entity 802 to inform credit card entity 802 of the transaction and/or possible transaction. Message 909 serves to inform OSP 102a-1 that legal entity 115a is aware of the transaction, and forces OSP 102a-1 to use credit card entity 802 for billing such that tax can be collected on the transactions. Message 910 serves to inform legal entity 115a of the transactions such that if tax is not remitted on the transactions, further remedial legal action can be taken to collect the tax.

Figure 11:
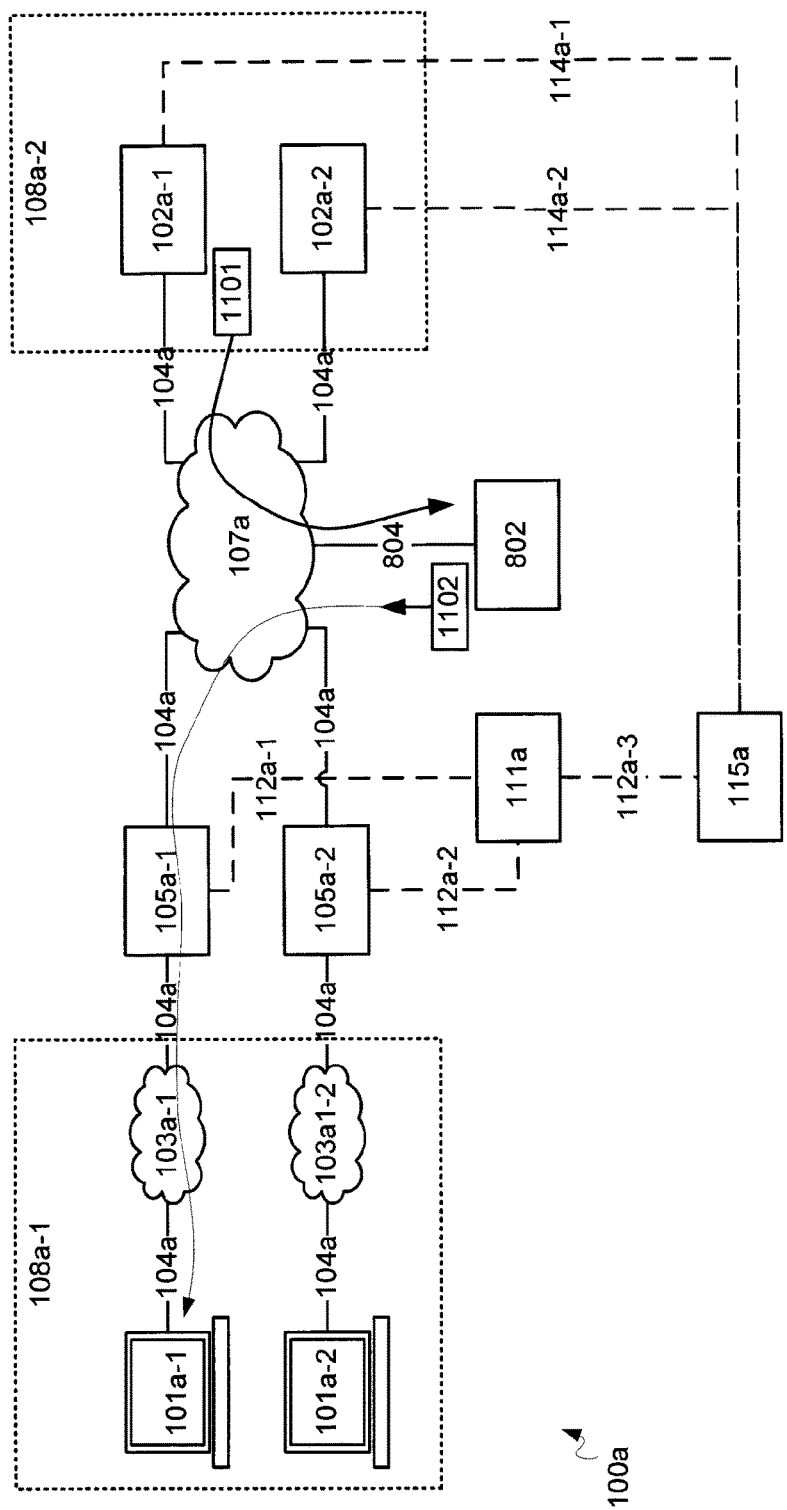
FIGS. 11 to 14 depict systems for cross jurisdictional internet enforcement, according to non-limiting implementations.

As depicted in FIG. 11, Once a transaction is completed, OSP 102a-1 transmits an invoice 1101 for the transaction to credit card entity 802 where tax is added to the invoice and a bill 1102 can be issued to device 101a-1, either electronically (as depicted in FIG. 11) or non-electronically (i.e. via mail, not depicted).

It is furthermore appreciated that once messages 909, 910 are transmitted, device 101a-1 and OSP 102-1 can then resume communications 801 as depicted in FIG. 8 to complete the transaction. Alternatively, server 105a-1 can continue to participate in the communications between device 101a-1 and OSP 102-1 as in FIG. 9, such that details of any transactions can also be tracked and transmitted to legal authority 115a. In these implementations, server 105a effectively takes over communications 801.

In some implementations, however, server 105a-1 can collect tax directly on any transactions and cause the tax to be remitted to legal entity 115a, for example by collecting bank account data, or the like, from device 101b-1 and causing the tax to be collected directly from an account associated with device 101b.

In yet further implementations, server 105a can cause tax to be collected by collecting the credit card information from device 101a-1 using a GUI similar to GUI 1000, and further act as an intermediary in the transaction such that server 105a effectively collects credit card data, billing data and tax data and remits collected tax to legal entity 115a.

Figure 12:
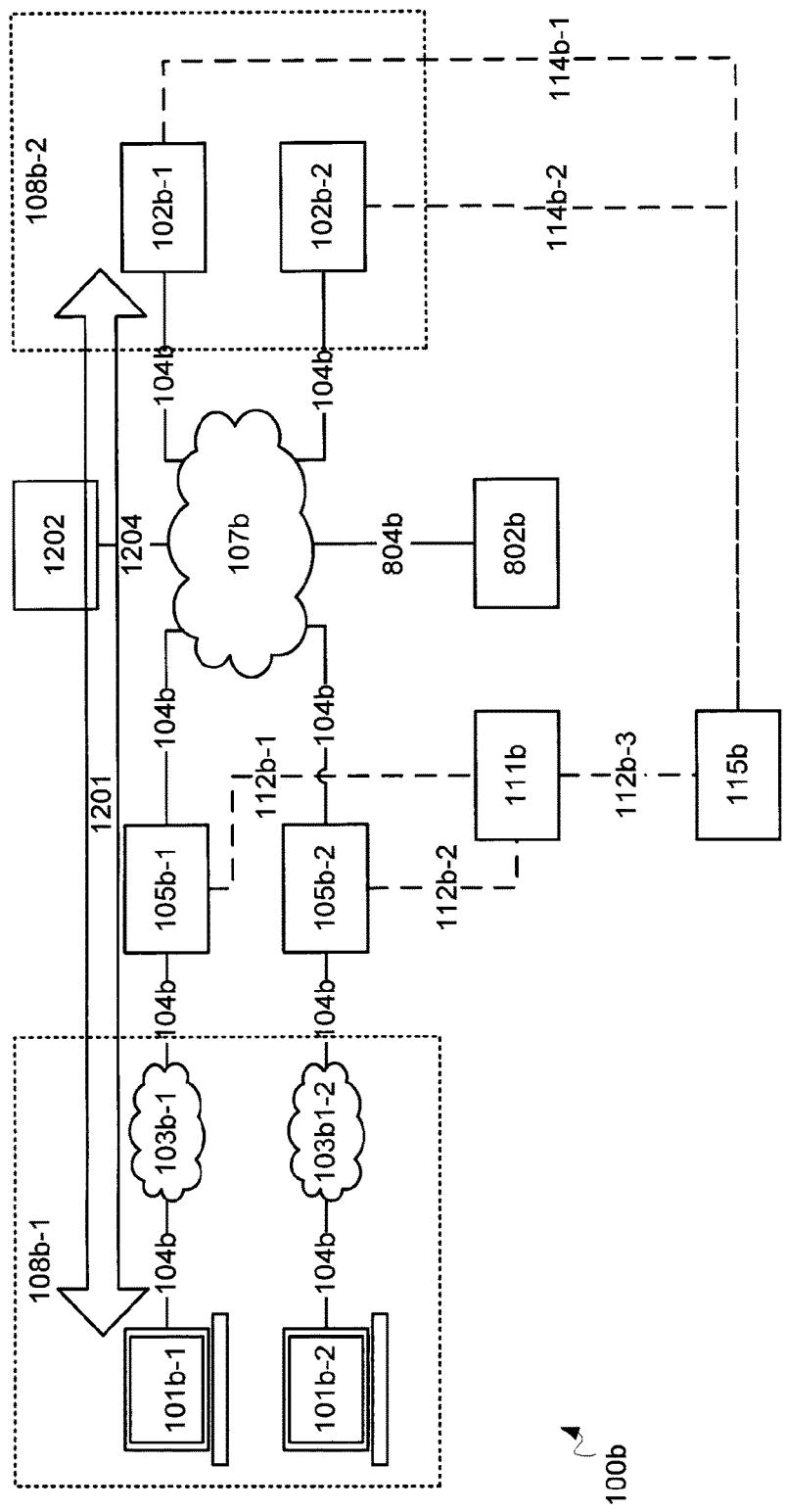
Figure 13:
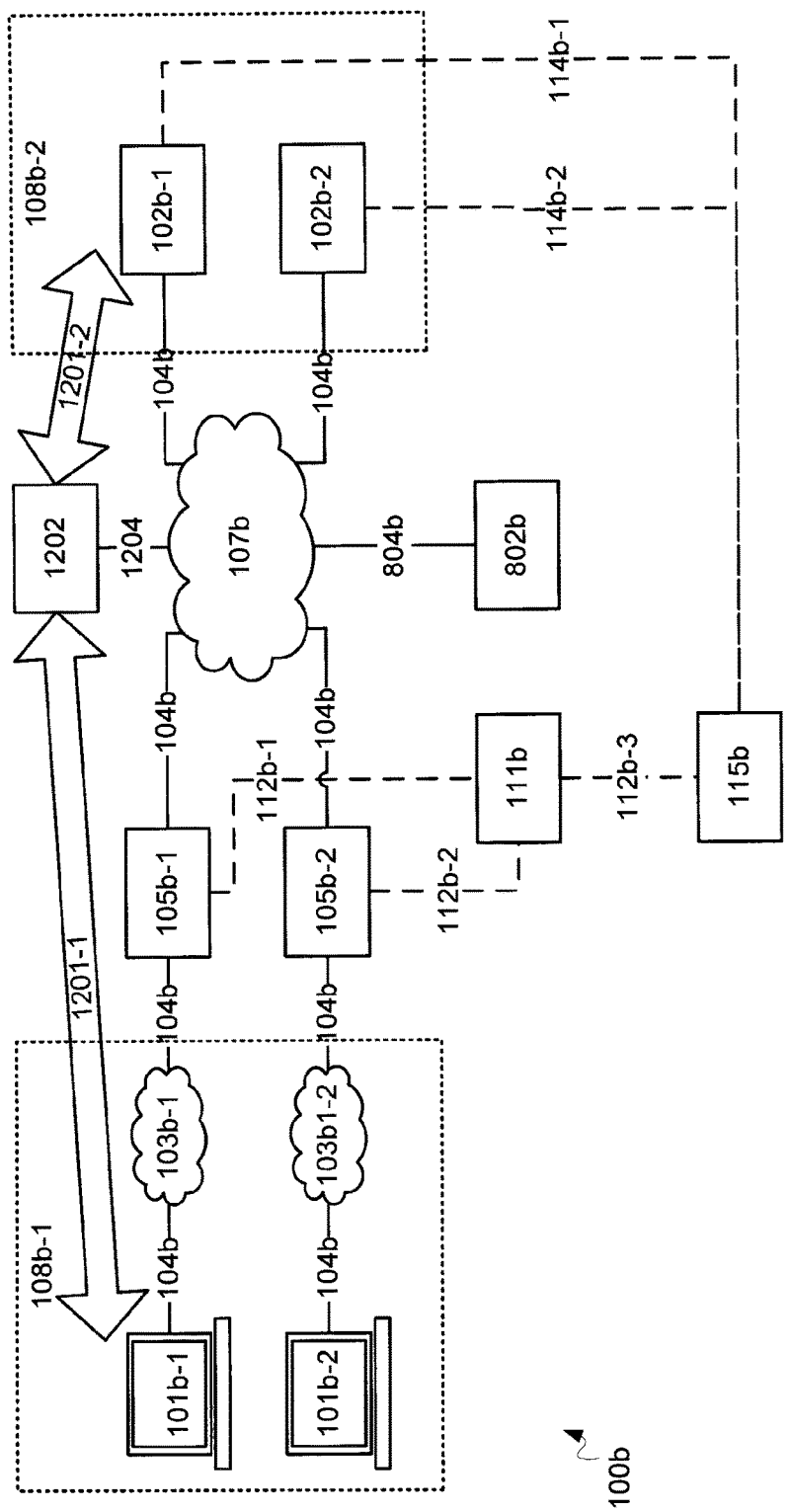

Attention is now directed to FIG. 12, which is, which is substantially similar to FIG. 8, with like elements having like numbers, though with a "b" appended thereto rather than an "a". It is assumed in FIG. 12 that communications 1201 have been established between device 101b-a and OSP 108b-2. System 100b includes an intermediary billing server 1202 enabled to communicate with servers 105b, devices 101b, OSPs 102a and/or credit card entity 802b via network 107b and a link 1204. It is appreciated that server 1202 comprises a server environment which can be similar or different from aggregator 111, and that link 1204 can be similar or different from links 104. In other implementations, server 1202 can be enabled to communicate via one of networks 103b rather than network 107b. In any event, system 100b has similar functionality to system 100a, however server 105b is enabled to redirect communications 1201 server 1202, as depicted in FIG. 13 such that server 1202 intercepts communications between device 101b-1 and OSP 108b-2 to effectively split on-line communications 1201 into communications 1201-1, 1201-2 respectively between device 101a-1 and server 1202, and server 1202 and OSP 102a-1. System 100b otherwise behaves similar to system 100a but with server 1202 acting as the billing intermediary to one or more of collect credit card information, billing information, tax collection authorization, and tax.

Hence, it is yet further appreciated that server 105a and/or aggregator 111a and/or legal entity 115a and/or server 1202 can cause the tax and/or tax submissions to be collected by one or more of taking over on-line communications 801, 1201; participating in the on-line communications 801, 1201 and injecting a message into on-line communications 801, 1201. Furthermore, server 105a and/or aggregator 111a and/or legal entity 115a and/or server 1202 can cause the tax collections to be collected by receiving authorization from at least one device 101a, 101b for a credit card company, as represented by credit card entities 802, 802b, to add sales tax to a bill for at least one on-line transaction associated with on-line communications 801, 1201. In addition, server 105a and/or aggregator 111a and/or legal entity 115a and/or server 1202 can be enabled to communicate at least a portion of legal data 113a, 113b to one or more of devices 101a, 101b and OSPs 102a, 102b by one or more of taking over on-line communications 801, 1201; participating in on-line communications 801, 1201 and injecting a message into on-line communications 801, 1201.

Heretofore, implementations have been discussed with regards to tax collection for on-line transactions, for example between a device in a first jurisdiction and an OSP in a second jurisdiction. Hence, and with reference to FIGS. 2 to 7, in these implementations: legal data 113 comprises tax submissions associated with an OSP 102; given criteria 250 comprises the tax submissions being less than a given threshold of tax collected from at least one OSP 102 on-line sales presence; and, the remedial legal action comprises triggering an audit of at least one OSP 102. Furthermore an intermediation server for cross-jurisdictional internet enforcement can comprise one or more of: at least one interception server 105 for intercepting the on-line communications between at least one communication device 101 and at least one OSP 102; at least one aggregator server 111 in communication with the at least one interception server 105 for aggregating interception data 109 received from the at least one interception server 105; and a taxation authority server, such as legal entity 115, in communication with at least one of the at least one interception server 105 and the at least one aggregator 111.

Figure 14:
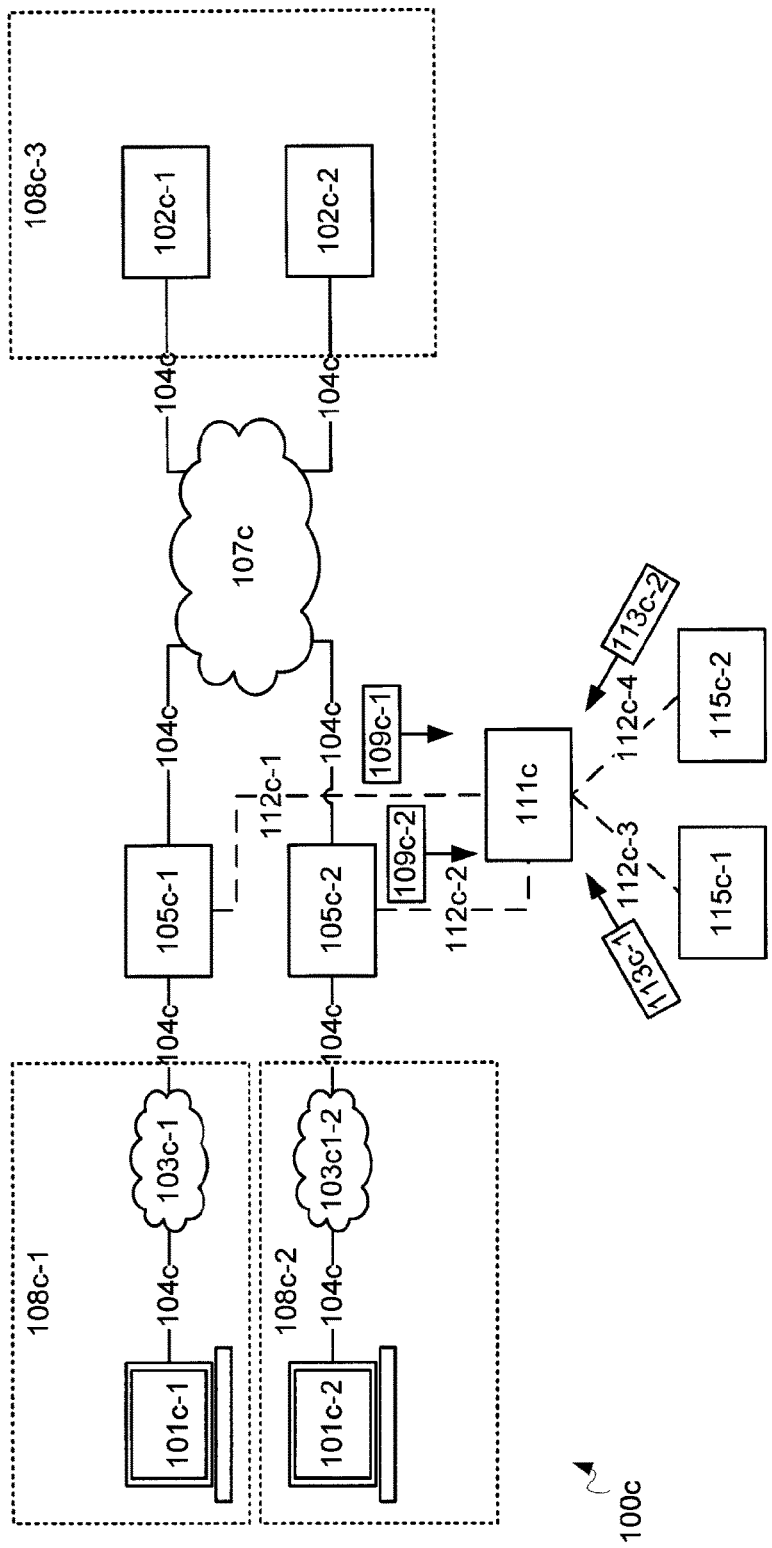

However, it is also possible to collect tax across a plurality of jurisdictions. For example, attention is directed to FIG. 14, which is substantially similar to FIG. 1, with like elements having like numbers, though with a "c" appended thereto. System 100c is substantially similar to system 100a, however devices 101c-1, 101c-2 are located in different respective jurisdictions 108c-1, 108c-2, that can have different given legal criteria associated with on-line transactions, including but not limited to different tax laws, different tax rates and the like. It is also assumed in system 100c that at least one of OSPs 102c-1, 102c-2 are located in yet a third jurisdiction 108c-3. It is furthermore appreciated that respective jurisdictions 108c-1, 108c-2 are associated with different respective legal entities 115c-2, 115c-2, each in communication with aggregator 111c via respective links 112c-3, 112c-4, and each providing respective legal data 113c-1, 113c-2 similar to legal data 113c but respective to each jurisdiction 108c-1, 108c-2. For example, when legal data 113c comprises tax submissions, the tax submissions comprise respective tax submissions for respective jurisdictions 108c.

While not depicted, each legal entity 115*c* can be enabled to communicate with each OSP 102*c* via respective links similar to links 114 of system 100; such links are not depicted for clarity.

Figure 15:
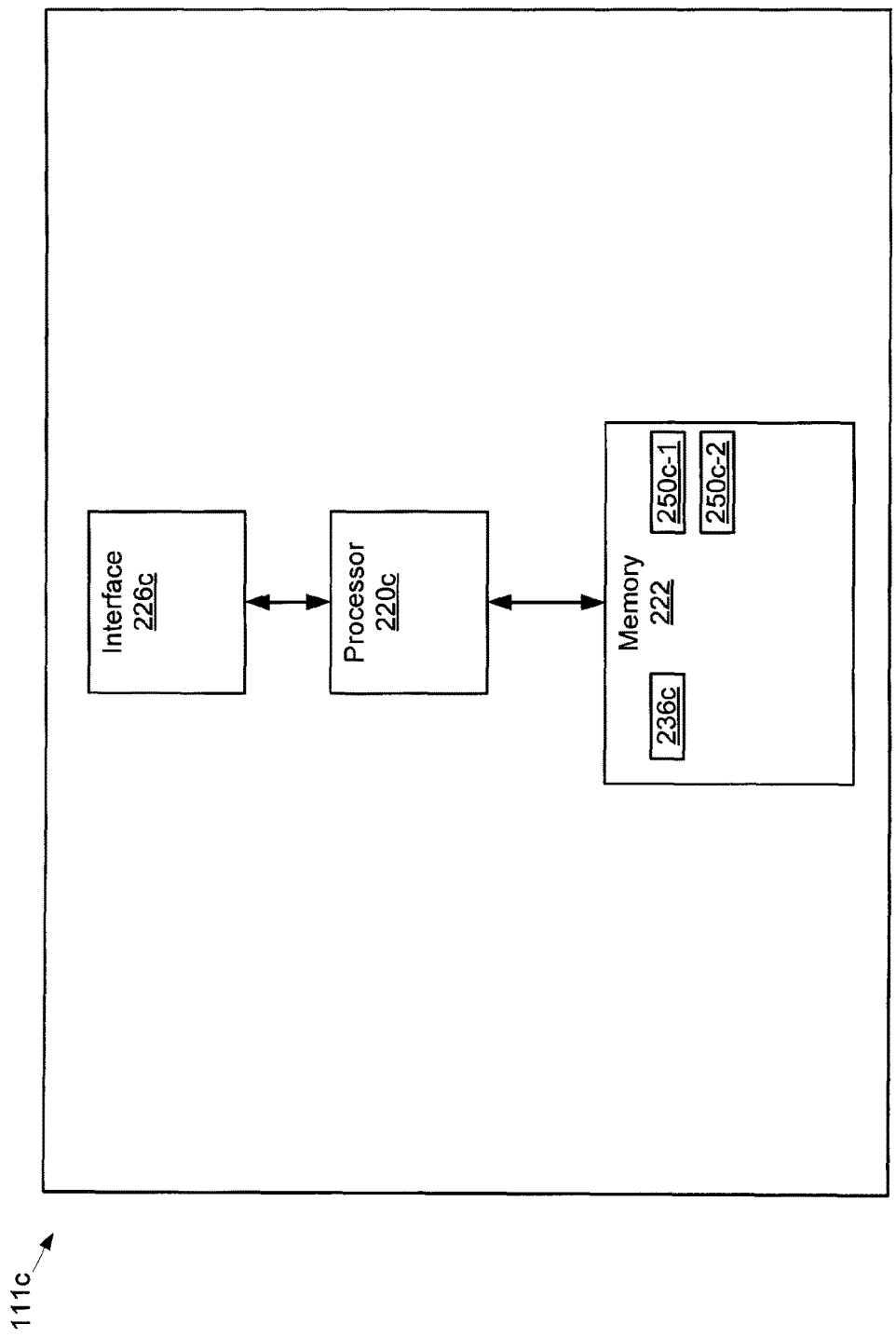
FIG. 15 depicts an aggregator intermediation server, according to non-limiting implementations.

In any event, system 100*c* has functionality similar to system 100*a*, with method 300 implementable at aggregator 111*c* (and/or one or more of servers 105*c* and/or one or more of legal entities 115*c* and/or a combination). However, as depicted in FIG. 15, which is substantially similar to FIG. 2, with like elements having like numbers with a "c" appended thereto, aggregator 100*c* stores given criteria 250*c*-1, 250*c*-2 associated with each respective jurisdiction 108*c*-1, 108*c*-2, given criteria 250*c* each comprising data for determining when to trigger remedial legal action against a given OSP 102 in a respective jurisdiction 250*c*. In implementations where legal data 113*c* comprises tax submissions, given criteria 250*c* comprises jurisdictional criteria each comprising at least one of the respective tax submissions being less than a respective given threshold of respective tax collected from an OSP 102 for each of the respective jurisdictions 108*c*-1, 108*c*-2.

Figure 16:
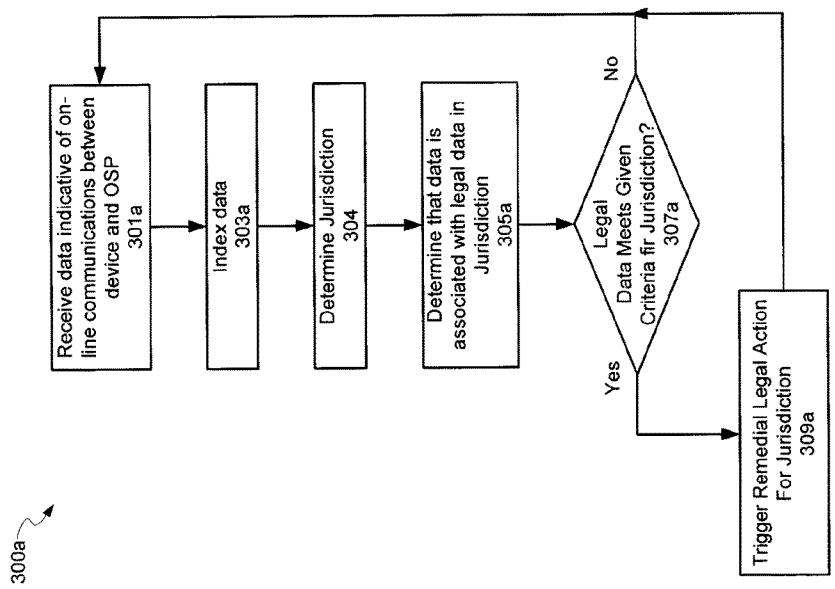
FIG. 16 depicts a method for cross jurisdictional internet enforcement, according to non-limiting implementations.

Hence, for example, system 100*c* can be enabled to implement method 300*a* depicted in FIG. 16, for cross-jurisdictional internet enforcement, In order to assist in the explanation of method 300*a*, it will be assumed that method 300*a* is performed using system 100*c*. Furthermore, the following discussion of method 300*a* will lead to a further understanding of system 100*c* and its various components. However, it is to be understood that system 100*c* and/or method 300*a* can be varied, and need not work exactly as discussed herein in conjunction with each other, and that such variations are within the scope of present implementations.

In general, it is appreciated that method 300*a* is substantially similar to method 300, with like elements having like numbers, however with an "a" appended thereto. However, method 300*a* comprises an additional block 304 for determining a jurisdiction 108*c* from which data 109*a* is received. Furthermore, each of steps 305*a* to 309*a* are adapted to be implemented in association with jurisdiction 108*c* determined at block 304. For example, once data 109*c* is received and indexed at aggregator 111*c*, the jurisdiction 108*c* with which data 109*c* is associated is determined at block 304 by any suitable method, including but limited to processing data 109*c*, determining an IP address of server 105*c* from which data 109*c* is received, looking up the IP address of server 105*c* from which data 109*c* is received in a table (not depicted) where the jurisdiction 108*c* is stored in association, and the like. It is appreciated that, in some implementations, block 304 can be executed prior to block 303*a*.

Once the jurisdiction 108*c* is determined, at block 305*a*, it is determined that data 109*c* is associated with legal data 113*c* associated with the same jurisdiction 108*c* from which data 109*c* was received. Similarly, at block 307*a*, legal data 113*c* associated with the same jurisdiction 108*c* from which data 109*c* was received is compared to given criteria 250*c* for the same jurisdiction 108*c* to trigger, at block 309*c*, remedial legal action in the same jurisdiction 108*c*.

In implementations, where tax is collected as part of the remedial legal action and/or as part of the transaction process between a device 101*c* and an OSP 102*c*, and hence where each legal entity 115*c* comprise a tax authority, the remedial legal action can comprise triggering an audit of an OSP 102*c* for the respective jurisdiction 108*c*-1, 108*c*-2 where the jurisdictional given criteria is met.

Figure 17:
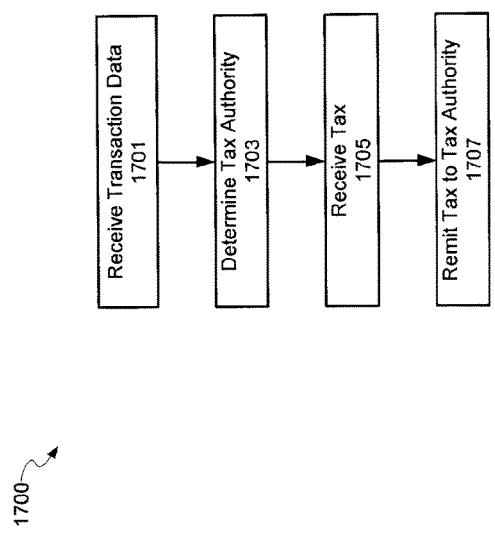
FIG. 17 depicts a method for remitting tax to one of a plurality of tax authorities, according to non-limiting implementations.

Furthermore, in implementations where tax is collected, either as part of the remedial legal action and/or as part of the transaction process between a device 101*c* and an OSP 102*c*, a method 1700 can thereafter be implemented, as depicted in FIG. 17. In order to assist in the explanation of method 1700, it will be assumed that method 1700 is performed using system 100*c*. Furthermore, the following discussion of method 1700 will lead to a further understanding of system 100*c* and its various components. However, it is to be understood that system 100*c* and/or method 1700 can be varied, and need not work exactly as discussed herein in conjunction with each other, and that such variations are within the scope of present implementations.

At block 1701, transaction data is received at aggregator 111*c* or any other suitable server, for example, a server similar to intermediary billing server 1202. The transaction data can comprise, for example, data 109*c* and/or data associated with a transaction between a device 101*c* and an OSP 102*c* collected similar to methods described above with respect to systems 100*a* and 100*b*.

At block 1702, the tax authority associated with the transaction/transaction data is determined, by any suitable method, including but limited to processing data 109*c*, determining an IP address of server 105*c* from which data 109*c* is received, looking up the IP address of server 105*c* from which data 109*c* is received in a table (not depicted) where the jurisdiction 108*c* is stored in association, and the like. In other words, the tax authority can be determined by determining the jurisdiction 108*c* associated with the transaction.

At block 1705, the tax is received using any suitable method, including but not limited to methods described above with respect to systems 100*a* and 100*b*.

At block 1707, the tax is remitted to the tax authority determined at block 1703.

It is appreciated that blocks 1701 to 1705 can be executed in any suitable order, and that block 1701 can be optional. In other words, the tax can be received independent of the transaction data, and the tax authority can be determined before or after receiving the tax.

It is further appreciated that tax can be collected in addition to and/or as part of, enforcement methods for cross-jurisdictional internet enforcement described above. For example, method 1700 can be implemented as part of method 300*a* and/or in parallel with 300*a*. In other words, tax can be collected as part of remedial legal action or as a separate process: for example, tax associated with a transaction can be collected from a device 101*c* and/or an audit of an OSP 102*c* associated with the transaction can be triggered.

Figure 18:
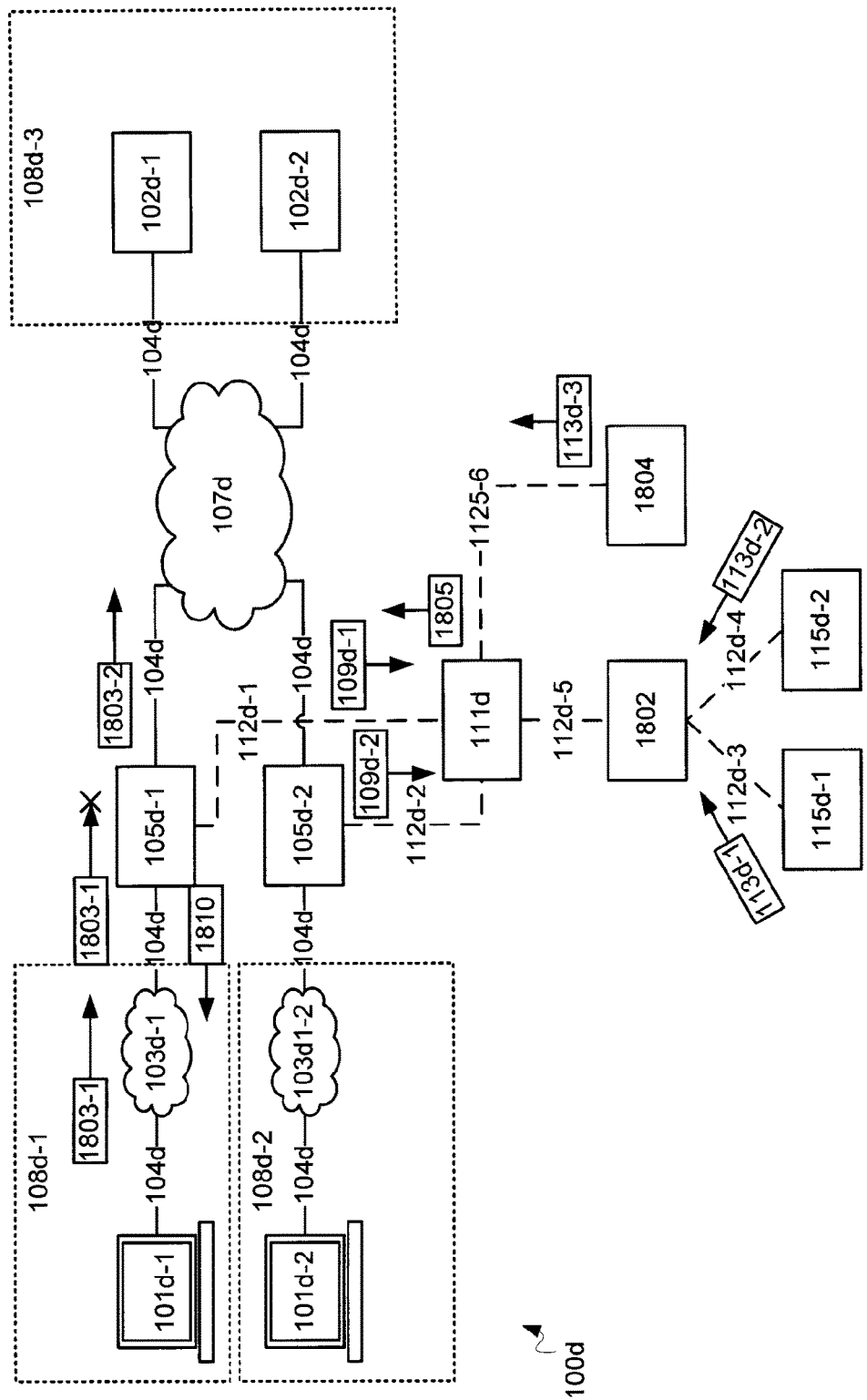
FIG. 18 depicts a system for cross jurisdictional internet enforcement, according to non-limiting implementations.

Attention is next directed to FIG. 18, which depicts a system 100*d* for cross-jurisdictional internet enforcement. System 100*d* is substantially similar to system 100*c*, of FIG. 14, with like elements having like numbers, though with a "d" appended thereto rather than a "c". In any event, system 100*d* further comprises a taxation trusted party (TTP) 1802 in communication with aggregator 111*d* via a link 112*d*-5. TTP 1802 can include, but is not limited to, a financial institution, such as a bank or the like, and third party financial service provider. It is appreciated that TTP 1802 comprises a server environment that can be similar or different to aggregator 111. In any event, in these implementations, taxation trusted authority is enabled to distribute taxes to legal entities 115*d*. In other words, tax can be collected by at least one of servers 105*d* and aggregator 111*d*, and provided to TTP 1802, which then implements at least blocks 1703 to 1707 of method 1700. Hence, TTP 1802 distributes taxes to the relevant taxation authority.

Furthermore, legal data 113d can be received at either taxation trusted party 1802 and/or aggregator 111d when implementing method 300a. In some implementations aggregator 111d can access legal data 113d via taxation trusted party 1802, for example in queries to TTP 1802 via link 112d-5, prior to implementing block 305a of method 300a.

In depicted implementations aggregator 111d is further enabled to communicate with other enforcement entities, for example enforcement entity 1804, for enforcing, for example, injunctions against OSPs 102d. For example, enforcement entity 1804 can also comprise a legal entity associated with one or more jurisdictions 108d-1, 108d-2, 108d-3, and further comprising a server environment that can be similar or different to aggregator 111. For example, enforcement entity 1804 can comprise a server associated with a law enforcement entity such as Canada Revenue Agency (CRA), Royal Canadian Mounted Police (RCMP), Federal Bureau of Investigation (FBI), Central Intelligence Agency (CIA), Interpol, customs agencies, and the like. In any event enforcement entity 1804 can be generally responsible for enforcing injunctions, and the like, against a given OSP 102d (e.g. OSP 102d-1) and to provide legal data 113d-3 to notify aggregator 111d of such an injunction. Aggregator 111d can inform at least one server 105d, via data 1805, to block communications to the given OSP 102d-1, such that requests 1803-1 from device 101d-1 to OSP 102d-1 are blocked by server 105d-1 and requests 1803-2 to OSP 102d-1 are not blocked, similar FIG. 6.

Hence, in these implementations: legal data 113d-3 comprises an injunction against at least one OSP 102d; the given criteria (similar to given criteria 250c) stored at aggregator 111d comprises when the injunction is in place, the at least one OSP 102d is to be prevented from providing services in at least one jurisdiction 108d; and, the remedial legal action comprises blocking communications with the at least one OSP 102d in the at least one jurisdiction 108d. It is furthermore appreciated that system 100d can comprise different enforcement entities for different jurisdictions and that in some implementations, such enforcement entities can cross-jurisdictional and/or multi-jurisdictional.

Hence, system 108d can enforce different types of remedial legal action one or more of substantially simultaneously, in parallel with one another, and/or at different times. However, it is understood that any of systems 100, 100a, 100b, 100c and 100d can comprise legal entities of different types such that different types of remedial legal action one or more of substantially simultaneously, in parallel with one another, and/or at different times.

For example, to block a given OSP, method 1900 depicted in FIG. 19 can be implemented at one or more of servers 105d. In order to assist in the explanation of method 1900, it will be assumed that method 1900 is performed using system 100d. Furthermore, the following discussion of method 1900 will lead to a further understanding of system 100d and its various components. However, it is to be understood that system 100d and/or method 1900 can be varied, and need not work exactly as discussed herein in conjunction with each other, and that such variations are within the scope of present implementations.

At block 1901, a list of identifiers of one or more OSPs 102d to be blocked is received. In some implementations, the given criteria 250, 250c comprises the identifier and/or list of identifiers of OSPs 102d to be blocked.

At block 1903, a request 1803 transmitted to an OSP 102d from a device 101d is received at a server 105d, as described above.

At block 1905 it is determined whether or not the OSP 102d associated with the request 1803 is on the list received at block 1901. If not, at block 1907, server 105d allows request 1803 to be transmitted to OSP 102d (e.g. request 1803-2); if so, at block 1909, server 105d blocks request 1803 from being transmitted to OSP 102d (e.g. request 1803-1). In some implementations, server 105d can then transmit a response 1810 to device 101d informing them that requests to the given OSP 102d are blocked, similar to response 605.

With further reference to FIG. 18, in particular non-limiting implementations at least one of OSPs 102d can comprise a gaming site and/or a gambling site. Hereafter gaming and/or gambling sites will be referred to as gaming sites. It is appreciated that on-line gaming/gambling is illegal in some jurisdictions, yet gaming/gambling sites can be located anywhere in the world and easily accessed via the Internet. Hence, to block access to gaming sites, method 1900 can be implemented, with the check performed effectively determining whether gaming sites are valid within the jurisdiction 108d from which request 1803 (a request to a gaming site) is received. Indeed, it is appreciated that while method 1900 has been described with respect to a list of identifiers of blocked OSPs 102d, any method can be used to block a given site. For example, method 1900 can be adapted such that general legal criteria are received at block 1901, such as "Block all gaming sites", and then implemented at block 1905. In these implementations a method for determining whether a request 1803 meets the general legal criteria or not is implemented, of which comparing an identifier of an OSP 102d to a list of blocked OSPs 102d is but one example. For example, a server 105d could also determine that a request 1803 is intended for a gaming site by processing a request 1803 to determine whether the request 1803 comprises gaming data (i.e. an amount of money to bet in a given game or the like).

It is furthermore appreciated that one or more servers 105d can be enabled to access gaming laws stored at legal entities associated with respective jurisdictions 108d to determined whether or not to block access to gaming sites in a given jurisdiction 108d; hence if the laws change, servers 105d can be automatically updated.

Hence, remedial legal action can be enforced against a given on-line service provider using intermediation servers in combination with interception servers, in order to enforce cross-jurisdictional collection of taxes, cross-jurisdictional injunctions or any other suitable remedial action.

Those skilled in the art will appreciate that in some implementations, the functionality of devices 101, 101a, 101b, 101c, OSPs 102, 102a, 102b, 102c, servers 105, 105a, 105b, 105c, aggregators 111, 111a, 111b, 111c, legal entities 115, 115a, 115b, 1115c, credit card entities 802, 802b, server 1202, taxation trusted party 1802, and enforcement entity 1804 can be implemented using pre-programmed hardware or firmware elements (e.g., application specific integrated circuits (ASICs), electrically erasable programmable read-only memories (EEPROMs), etc.), or other related components. In other implementations, the functionality of devices 101, 101a, 101b, 101c, OSPs 102, 102a, 102b, 102c, servers 105, 105a, 105b, 105c, aggregators 111, 111a, 111b, 111c, legal entities 115, 115a, 115b, 1115c, credit card entities 802, 8022b, server 1202, taxation trusted party 1802, and enforcement entity 1804 can be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive). Furthermore, it is appreciated that the computer-readable program can be stored as a computer program product comprising a computer usable medium. Further, a persistent storage device can comprise the computer readable program code. It is yet further appreciated that the computer-readable program code and/or computer usable medium can comprise a non-transitory computer-readable program code and/or non-transitory computer usable medium. Alternatively, the computer-readable program code could be stored remotely but transmittable to these components via a modem or other interface device connected to a network (including, without limitation, the Internet) over a transmission medium. The transmission medium can be either a non-mobile medium (e.g., optical and/or digital and/or analog communications lines) or a mobile medium (e.g., microwave, infrared, free-space optical or other transmission schemes) or a combination thereof.

Persons skilled in the art will appreciate that there are yet more alternative implementations and modifications possible for implementing the implementations, and that the above implementations and examples are only illustrations of one or more implementations. The scope, therefore, is only to be limited by the claims appended hereto.

What is claimed is:

1. A system comprising:
   an interception server configured to intercept on-line communications between at least one communication device and at least one on-line sales presence, the on-line communications including encrypted communications, wherein the interception server is an edge server;
   an aggregator server configured to aggregate interception data indicative of a number of on-line communications between the at least one communication device and the at least one on-line sales presence; and
   criteria to detect a discrepancy between legal data and the interception data indicative of a number of on-line communications between the at least one communication device and a given on-line sales presence;
   the aggregator server further configured to receive the legal data associated with the at least one on-line sales presence, the legal data indicating an amount of tax collected from the at least one on-line sales presence, the aggregator server further configured to evaluate the criteria by comparing the amount of tax collected to an estimate based on the number of on-line communications indicated by the interception data, and the aggregator server further configured to trigger blocking of communications between the at least one communication device and the given on-line sales presence of the at least one on-line sales presence when the criteria is met.

2. The system of claim 1, wherein the interception server is further configured to index the interception data such that the interception data can be referenced in determining discrepancy with the legal data.

3. The system of claim 1, wherein the legal data comprises tax submissions associated with the at least one on-line sales presence, the aggregator server further configured to trigger an audit of the given on-line sales presence when the tax submissions of the given on-line sales presence are less than a given threshold of tax collected from the given on-line sales presence.

4. The system of claim 3, wherein the tax submissions comprise respective tax submissions for respective jurisdictions, the aggregator server further configured to trigger the audit of the given on-line sales presence for the respective jurisdiction where jurisdictional criteria is met, the jurisdictional criteria each comprising at least one of the respective tax submissions being less than a respective given threshold of respective tax collected from the at least one on-line sales presence for each of the respective jurisdictions.

5. The system of claim 3, wherein the aggregator server further configured to cause the tax submissions to be collected by one or more of taking over the on-line communications; participating in the on-line communications and injecting a message into the on-line communications.

6. The system of claim 5, wherein the aggregator server further configured to determine a tax authority associated with the tax submissions and remit the tax submissions to the tax authority.

7. The system of claim 5, wherein the aggregator server further configured to cause the tax collections to be collected by receiving authorization from the at least one communications device for a credit card company to add sales tax to a bill for at least one on-line transaction associated with the on-line communications.

8. The system of claim 1, wherein the aggregator server further configured to communicate at least a portion of the legal data to one or more of the at least one communication device and the on-line sales presence by one or more of taking over the on-line communications; participating in the on-line communications and injecting a message into the on-line communications.

9. The system of claim 1, wherein the interception data indicative of the on-line communications between the at least one communication device and the at least one on-line sales presence comprises one or more of:
   transactional data;
   a payment request from the at least one on-line sales presence;
   a first indication of one or more on-line communication sessions between the at least one communication device and the at least one on-line sales presence;
   a second indication of the one or more on-line communication sessions with at least one IP (internet protocol) address associated with the at least one on-line sales presence; and,
   a third indication of one or more encrypted on-line communication sessions with the at least one IP address associated with the at least one on-line sales presence.

10. The system of claim 1, wherein the legal data comprises an injunction against the given on-line sales presence, the aggregator server further configured to block communications with the given on-line sales presence in at least one jurisdiction when the injunction is in place to prevent the given on-line sales presence from providing services in at the least one jurisdiction.

11. A method comprising:
   intercepting, with an interception server, on-line communications between at least one communication device and at least one on-line sales presence, the on-line communications including encrypted communications;
   aggregating, at an aggregator server, interception data indicative of a number of on-line communications between the at least one communication device and the at least one on-line sales presence;

receiving legal data associated with the at least one on-line sales presence, the legal data indicating an amount of tax collected from the at least one on-line sales presence;

maintaining criteria to detect a discrepancy between the legal data and the interception data indicative of a number of on-line communications between the at least one communication device and a given on-line sales presence;

evaluating the criteria by comparing the amount of tax collected indicated by the legal data to an estimate based on the number of on-line communications indicated by the interception data; and triggering, at the aggregator server, blocking of communications between the at least one communication device and the given on-line sales presence of the at least one on-line sales presence when the criteria is met.

12. The method of claim 11, further comprising indexing the interception data such that the interception data can be referenced in determining discrepancy with the legal data.

13. The method of claim 11, wherein the legal data comprises tax submissions associated with the at least one on-line sales presence, the method further comprising triggering an audit of the given on-line sales presence when the tax submissions of the given on-line sales presence are less than a given threshold of tax collected from the given on-line sales presence.

14. The method of claim 13, wherein the tax submissions comprise respective tax submissions for respective jurisdictions, the method further comprising triggering the audit of the given on-line sales presence for the respective jurisdiction where jurisdictional criteria is met, the jurisdictional criteria each comprising at least one of the respective tax submissions being less than a respective given threshold of respective tax collected from the at least one on-line sales presence for each of the respective jurisdictions.

15. The method of claim 13, further comprising causing, at the aggregator server, the tax submissions to be collected by one or more of taking over the on-line communications; participating in the on-line communications and injecting a message into the on-line communications.

16. The method of claim 15, further comprising determining, at the aggregator server, a tax authority associated with the tax submissions and remitting the tax submissions to the tax authority.

17. The method of claim 15, further comprising causing, at the aggregator server, the tax collections to be collected by receiving authorization from the at least one communications device for a credit card company to add sales tax to a bill for at least one on-line transaction associated with the on-line communications.

18. The method of claim 11, further comprising communicating, at the aggregator server, at least a portion of the legal data to one or more of the at least one communication device and the on-line sales presence by one or more of taking over the on-line communications; participating in the on-line communications and injecting a message into the on-line communications.

19. The method of claim 11, wherein the interception data indicative of the on-line communications between the at least one communication device and the at least one on-line sales presence comprises one or more of:

transactional data;

a payment request from the at least one on-line sales presence;

a first indication of one or more on-line communication sessions between the at least one communication device and the at least one on-line sales presence;

a second indication of the one or more on-line communication sessions with at least one IP (internet protocol) address associated with the at least one on-line sales presence; and, a third indication of one or more encrypted on-line communication sessions with the at least one IP address associated with the at least one on-line sales presence.

20. The method of claim 11, wherein the legal data comprises an injunction against the given on-line sales presence, the method further comprising blocking communications with the given on-line sales presence in at least one jurisdiction when the injunction is in place to prevent the given on-line sales presence from providing services in at the least one jurisdiction.

21. The system of claim 1, wherein the interception server is configured to transmit the interception data to the aggregator server when a number of data exchanges of the on-line communications is above a given threshold number and/or a duration of on-line communications is above a given threshold time period.

22. The system of claim 1, wherein the aggregator server is further configured to request legal data associated with an on-line sales presence as triggered by receipt of a threshold number of indications that on-line communications have occurred with the on-line sales presence.

23. The method of claim 11, wherein the interception server is an edge server.

24. The method of claim 11, further comprising the interception server transmitting the interception data to the aggregator server when a number of data exchanges of the on-line communications is above a given threshold number and/or a duration of on-line communications is above a given threshold time period.

25. The method of claim 11, further comprising the aggregator server requesting legal data associated with an on-line sales presence as triggered by receipt of a threshold number of indications that on-line communications have occurred with the on-line sales presence.

* * * * *